(12) United States Patent
Zhang et al.

(10) Patent No.: US 11,070,847 B2
(45) Date of Patent: Jul. 20, 2021

(54) INTRA-PREDICTION WITH FAR NEIGHBORING PIXELS

(71) Applicant: QUALCOMM Incorporated, San Diego, CA (US)

(72) Inventors: Kai Zhang, San Diego, CA (US); Jianle Chen, San Diego, CA (US); Xin Zhao, Santa Clara, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/209,560

(22) Filed: Dec. 4, 2018

(65) Prior Publication Data
US 2019/0174145 A1    Jun. 6, 2019

Related U.S. Application Data

(60) Provisional application No. 62/594,989, filed on Dec. 5, 2017.

(51) Int. Cl.
*H04N 19/82* (2014.01)
*H04N 19/159* (2014.01)
(Continued)

(52) U.S. Cl.
CPC ........... *H04N 19/82* (2014.11); *H04N 19/105* (2014.11); *H04N 19/11* (2014.11); *H04N 19/159* (2014.11);
(Continued)

(58) Field of Classification Search
CPC ...... H04N 19/82; H04N 19/593; H04N 19/11; H04N 19/105; H04N 19/176; H04N 19/159
See application file for complete search history.

(56) References Cited

U.S. PATENT DOCUMENTS

| 9,247,251 B1 * | 1/2016 | Bultje | H04N 19/96 |
| 9,596,464 B2 * | 3/2017 | Song | H04N 19/50 |

(Continued)

FOREIGN PATENT DOCUMENTS

| EP | 3306935 A1 * | 4/2018 | ........... H04N 19/523 |
| EP | 3361726 A1 | 8/2018 | |

(Continued)

OTHER PUBLICATIONS

Balle J., et al., "Extended Texture Prediction for H.264/AVC Intra Coding", 31. VCEG Meeting; 79. MPEG Meeting; Jan. 15, 2007-Jan. 16, 2007;Marrakech; (Video Coding Experts Group of ITU-T SG-16) No. VCEG-AE11, Jan. 14, 2007 (Jan. 14, 2007), XP030003514, ISSN: 0000-0157, 7 pages.

(Continued)

*Primary Examiner* — Richard A Hansell, Jr.
(74) *Attorney, Agent, or Firm* — Shumaker & Sieffert, P.A.

(57) ABSTRACT

A video decoder can be configured to decode a block of video data by determining a block of video data is coded in an intra prediction mode; determining one or more samples for intra predicting the block of video data, wherein the one or more samples comprise samples that are already reconstructed and not adjacent to the block of video data; and based on the one or more samples, generating a predictive block for the block of video data.

15 Claims, 22 Drawing Sheets

(51) Int. Cl.
  *H04N 19/176*  (2014.01)
  *H04N 19/105*  (2014.01)
  *H04N 19/11*  (2014.01)
  *H04N 19/593*  (2014.01)

(52) U.S. Cl.
  CPC ......... *H04N 19/176* (2014.11); *H04N 19/593* (2014.11)

(56) References Cited

U.S. PATENT DOCUMENTS

| | | | |
|---|---|---|---|
| 10,432,929 | B2 | 10/2019 | Zhao et al. |
| 2013/0101036 | A1* | 4/2013 | Zhou ............... H04N 19/176 375/240.12 |
| 2015/0071357 | A1 | 3/2015 | Pang et al. |
| 2015/0373357 | A1 | 12/2015 | Pang et al. |
| 2017/0310959 | A1* | 10/2017 | Chen ............... H04N 19/11 |
| 2017/0347093 | A1* | 11/2017 | Yu ............... H04N 19/176 |
| 2018/0367793 | A1* | 12/2018 | Park ............... H04N 19/11 |
| 2019/0141317 | A1* | 5/2019 | Heo ............... H04N 19/105 |
| 2019/0273926 | A1* | 9/2019 | Heo ............... H04N 19/11 |
| 2019/0364298 | A1* | 11/2019 | Kang ............... H04N 19/139 |

FOREIGN PATENT DOCUMENTS

| | | | | |
|---|---|---|---|---|
| WO | 2017090993 | A1 | 6/2017 | |
| WO | WO-2017105141 | A1 * | 6/2017 | ........... H04N 19/159 |
| WO | WO-2017190288 | A1 * | 11/2017 | ........... H04N 19/563 |

OTHER PUBLICATIONS

Bross B., et al., "Versatile Video Coding (Draft 3)", Joint Video Experts Team (JVET) of ITU-T SG 16 WP 3 and ISO/IEC JTC 1/SC 291WG 11, 12th Meeting: Macao, CN, JVET-L1001-v9, Oct. 3-12, 2018, 235 pp.

Chen J., et al., "Algorithm description for Versatile Video Coding and Test Model 1 (VTM 1)", Joint Video Experts Team (JVET) of ITU-T SG 16 WP 3 and ISO/IEC JTC 1/SC 29/WG 11, 10th Meeting: San Diego, US, Apr. 10-20, 2018, JVET-J1002-v2, 10 pages.

Chen J., et al., "Algorithm description for Versatile Video Coding and Test Model 3 (VTM 3)", Joint Video Experts Team (JVET) of ITU-T SG 16 WP 3 and ISO/IEC JTC 1/SC 29/WG 11, JVET-L1002-v1, 12th Meeting: Macao, CN, Oct. 3-12, 2018, 48 pages.

Chen J., et al., Algorithm Description of Joint Exploration Test Model 2" Joint Video Exploration Team (JVET) of ITU-T SG 16 WP 3 and ISO/IEC JTC 1/SC 29/WG 11, 2nd Meeting: San Diego, Feb. 20-26, 2016, JVET-B1001-v3, 32 Pages.

Chen J., et al/, Algorithm Description of Joint Exploration Test Model 4" Joint Video Exploration Team (JVET) of ITU-T SG 16 WP 3 and ISO/IEC JTC 1/SC 29/WG 11, 4th Meeting: Chengdu, Oct. 15-21, 2016, JVET-D1001-v3, 39 pages.

Chen J., et al., "Algorithm Description of Joint Exploration Test Model 3", Document: JVET-C1001_v3, Joint Video Exploration Team (JVET) of ITU-T SG 16 WP 3 and ISO/IEC JTC 1/SC 29/WG 11, 3rd Meeting: Geneva, CH, May 26-Jun. 1, 2016, 37 pp.

Huang H., "EE2.1: Quadtree plus binary tree structure integration with JEM tools," Joint Video Exploration Team (JVET) of ITU-T SG 16 WP 3 and ISO/IEC JTC 1/SC 29/WG 11, 3rd Meeting: Geneva, CH, May 26-Jun. 1, 2016, JVET-C0024, 5 pp.

Huawei Technologies: "Affine Transform Prediction for Next Generation Video Coding," ITU-T SG16 Meeting; Oct. 12-23, 2015; Geneva, No. T13-SG16-C-1016, Sep. 29, 2015, XP030100743, 11 pages.

International Search Report and Written Opinion—PCT/US2018/064065—ISA/EPO—Mar. 4, 2019, 18 pp.

"ITU-T H265, Series H: Audiovisual and Multimedia Systems, Infrastructure of audiovisual services—Coding of moving video, High efficiency video coding," The International Telecommunication Union, Apr. 2015, 634 pp.

ITU-T Recommendation, H.264—Telecommunication Standardization Sector of ITU; Series H: Audiovisual and Multimedia Systems; Infrastructure of audiovisual services—Coding of moving video; "Advanced video coding generic audiovisual services", Mar. 2005, pp. 1-343.

Matsuo S., et al., "Intra Prediction with Spatial Gradients and Multiple Reference Lines A", Picture Coding Symposium 2009; Jun. 5, 2009-Aug. 5, 2009; Chicago, May 6 2009, XP030081823, 4 pages.

Wang Y-K. et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages.

International Preliminary Report on Patentability for corresponding PCT Application No. PCT/US2018/064065, dated Jun. 18, 2020, 11 pgs.

* cited by examiner

INTRA-PREDICTION WITH FAR NEIGHBORING PIXELS

This application claims the benefit of U.S. Provisional Patent Application 62/594,989, filed Dec. 5, 2017, the entire content of which is incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the recently finalized High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

One or more aspects of this disclosure relate to intra-prediction processing utilizing far neighboring pixels.

In one example, a method for decoding a block of video data, includes determining a block of video data is coded in an intra prediction mode; determining one or more samples for intra predicting the block of video data, wherein the one or more samples comprise samples that are already reconstructed and not adjacent to the block of video data; and based on the one or more samples, generating a predictive block for the block of video data.

According to another example, a device for decoding video data includes a memory configured to store a block of the video data and one or more processors configured to determine the block of video data is coded in an intra prediction mode; determine one or more samples for intra predicting the block of video data, wherein the one or more samples comprise samples that are already reconstructed and not adjacent to the block of video data; and based on the one or more samples, generate a predictive block for the block of video data.

According to another example, a computer-readable storage medium stores instructions that when executed by one or more processors cause the one or more processors to determine a block of video data is coded in an intra prediction mode; determine one or more samples for intra predicting the block of video data, wherein the one or more samples comprise samples that are already reconstructed and not adjacent to the block of video data; and based on the one or more samples, generate a predictive block for the block of video data.

According to another example, a device for decoding video data includes means for determining a block of video data is coded in an intra prediction mode; means for determining one or more samples for intra predicting the block of video data, wherein the one or more samples comprise samples that are already reconstructed and not adjacent to the block of video data; and means for generating a predictive block for the block of video data based on the one or more samples.

The details of one or more examples of the disclosure are set forth in the accompanying drawings and the description below. Other features, objects, and advantages will be apparent from the description, drawings, and claims.

DETAILED DESCRIPTION

Figure 1:
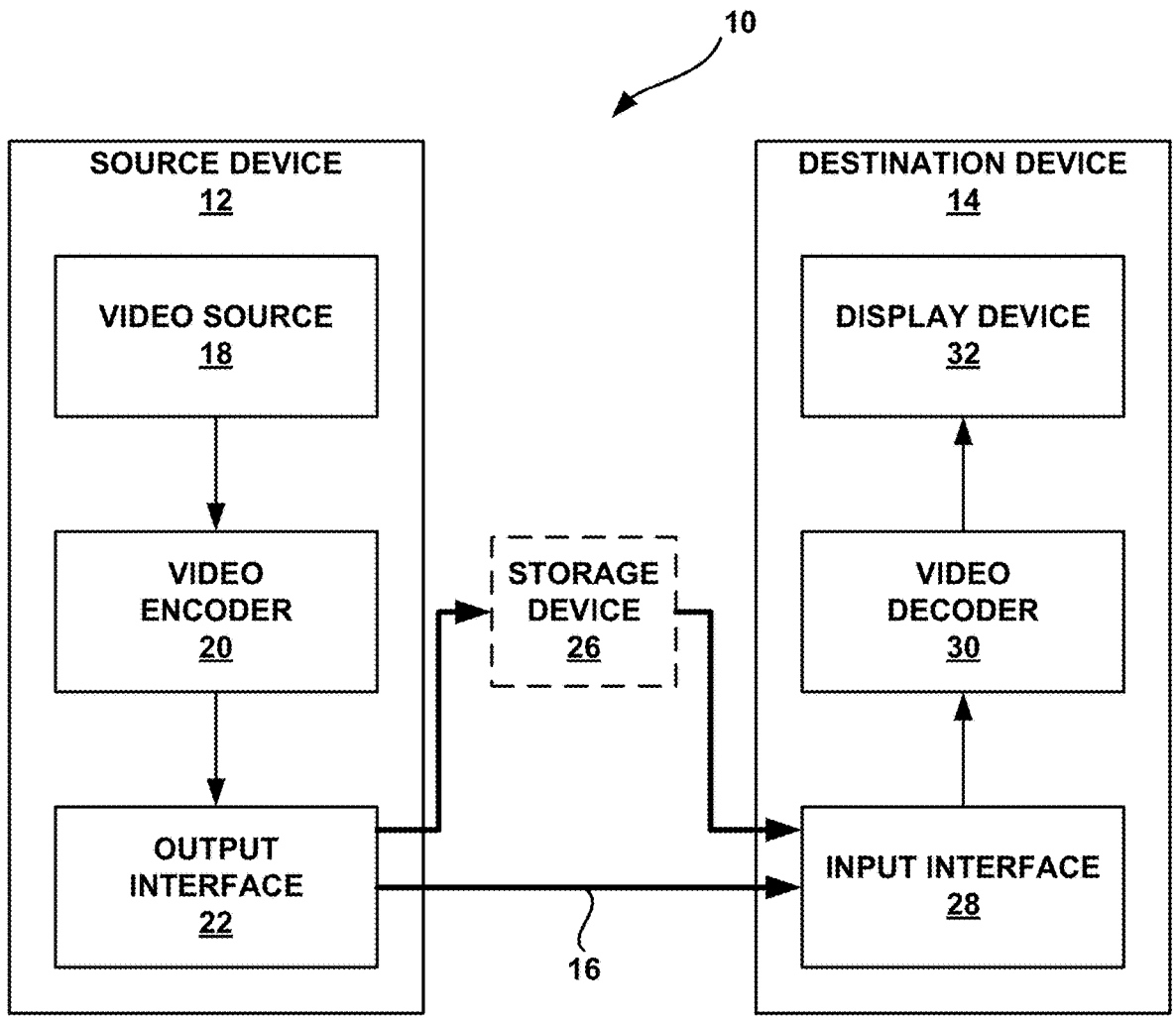
FIG. 1 is a block diagram illustrating an example video encoding and decoding system that may utilize the techniques described in this disclosure.

Various video coding standards, including the recently developed High Efficiency Video Coding (HEVC) standard, include predictive coding modes for video blocks, where a block currently being coded is predicted based on an already coded block of video data. In an intra prediction mode, the current block is predicted based on one or more previously coded, neighboring blocks in the same picture as the current block, while in an inter prediction mode the current block is predicted based on an already coded block in a different picture. In inter prediction mode, the process of determining a block of a previously coded frame to use as a predictive block is sometimes referred to as motion estimation, which is generally performed by a video encoder, and the process of identifying and retrieving a predictive block is sometimes referred to as motion compensation, which is performed by both video encoders and video decoders. Extensions of HEVC and successors to HEVC, including the Versatile Video Coding (VVC) standard presently under development, may also use additional coding modes, such as intra block copy, dictionary, and palette coding modes.

This disclosure describes techniques related to intra prediction and, more specifically, to intra-prediction that uses far neighboring pixels, where the term far neighboring pixels generally refers to pixels that are not located adjacent to a current block. The techniques described in this disclosure may enable an intra predicted block to more closely resemble a block of original video data, which can improve overall coding performance, as judged by rate-distortion tradeoff, for example. As one specific example that will be described in more detail below, the techniques of this disclosure may provide better coding performance when compared to existing techniques for performing intra prediction using unavailable pixels. The techniques of this disclosure may be used in the context of advanced video codecs, such as the next generation of video coding standards or image coding standards.

Various techniques in this disclosure may be described with reference to a video coder, which is intended to be a generic term that can refer to either a video encoder or a video decoder. Unless explicitly stated otherwise, it should not be assumed that techniques described with respect to a video encoder or a video decoder cannot be performed by the other of a video encoder or a video decoder. For example, in many instances, a video decoder performs the same, or sometimes a reciprocal, coding technique as a video encoder in order to decode encoded video data. In many instances, a video encoder also includes a video decoding loop, and thus the video encoder performs video decoding as part of encoding video data. Thus, unless stated otherwise, the techniques described in this disclosure with respect to a video decoder may also be performed by a video encoder, and vice versa.

This disclosure may also use terms such as current block, current picture, etc. In the context of this disclosure, the term "current" is intended to identify a block or picture that is currently being coded, as opposed to, for example, previously or already coded block or picture, or a yet to be coded block or picture.

FIG. 1 is a block diagram illustrating an example video encoding and decoding system 10 that may utilize the intra prediction techniques described in this disclosure. As shown in FIG. 1, system 10 includes a source device 12 that generates encoded video data to be decoded at a later time by a destination device 14. Source device 12 and destination device 14 may be any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may include any type of medium or device capable of moving the encoded video data from source device 12 to destination device 14. In one example, link 16 includes a communication medium to enable source device 12 to transmit encoded video data directly to destination device 14 in real-time. The encoded video data may be modulated according to a communication standard, such as a wireless communication protocol, and transmitted to destination device 14. The communication medium may include one or both of a wireless or a wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In another example, encoded data may be output from output interface 22 to a storage device 26. Similarly, encoded data may be accessed from storage device 26 by input interface. Storage device 26 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 26 may correspond to a file server or another intermediate storage device that may hold the encoded video generated by source device 12. Destination device 14 may access stored video data from storage device 26 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 26 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 26 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 26, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user and may be any of a variety of display devices such as a liquid crystal display (LCD), a plasma display, an organic light emitting diode (OLED) display, or another type of display device.

Video encoder 20 and video decoder 30 may operate according to a video compression standard, such as the recently finalized High Efficiency Video Coding (HEVC) standard and may conform to the HEVC Test Model (HM). Video encoder 20 and video decoder 30 may additionally operate according to an HEVC extension, such as the range extension, the multiview extension (MV-HEVC), or the scalable extension (SHVC) which have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

Video encoder 20 and video decoder 30 may also operate according to other proprietary or industry standards, such as the ITU-T H.264 standard, alternatively referred to as ISO/IEC MPEG-4, Part 10, Advanced Video Coding (AVC), or extensions of such standards, such as the Scalable Video Coding (SVC) and Multi-view Video Coding (MVC) extensions. The techniques of this disclosure, however, are not limited to any particular coding standard. Other examples of video compression standards include ITU-T H.261, ISO/IEC MPEG-1 Visual, ITU-T H.262 or ISO/IEC MPEG-2 Visual, ITU-T H.263, and ISO/IEC MPEG-4 Visual.

ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The JVET first met during 19-21 Oct. 2015. One version of reference software, i.e., Joint Exploration Model 2 (JEM 2) can be downloaded from: https://jvet.hhi.fraunhofer.de/svn/svn_HMJEMSoftware/tags/HM-16.6-JEM-2.0/. An algorithm for JEM2 is described in J. Chen, E. Alshina, G. J. Sullivan, J.-R. Ohm, J. Boyce, "Algorithm description of Joint Exploration Test Model 2", JVET-B1001, San Diego, March 2016. Another version of the reference software, i.e., Joint Exploration Model 3 (JEM 3) can be downloaded from: https://jvet.hhi.fraunhofer.de/svn/svn_HMJEMSoftware/tags/HM-16.6-JEM-3.0/. The Algorithm description for JEM3 may also be referred to as JVET-C1001. An algorithm for JEM4 is described in J. Chen, E. Alshina, G. J. Sullivan, J.-R. Ohm, J. Boyce, "Algorithm Description of Joint Exploration Test Model 4," JVET-D1001, October 2016.

Based on the work of ITU-T VCEG (Q6/16) and ISO/IEC MPEG (JTC 1/SC 29/WG 11), a new video coding standard, referred to as the Versatile Video Coding (VVC) standard, is under development by the Joint Video Expert Team (JVET) of VCEG and MPEG. An early draft of the VVC is available in the document JVET-J1001 "Versatile Video Coding (Draft 1)" and its algorithm description is available in the document JVET-J1002 "Algorithm description for Versatile Video Coding and Test Model 1 (VTM 1)." Another early draft of the VVC is available in the document JVET-L1001 "Versatile Video Coding (Draft 3)" and its algorithm description is available in the document JVET-L1002 "Algorithm description for Versatile Video Coding and Test Model 3 (VTM 3)."

Techniques of this disclosure may utilize HEVC terminology for ease of explanation. It should not be assumed, however, that the techniques of this disclosure are limited to HEVC, and in fact, it is explicitly contemplated that the techniques of this disclosure may be implemented in successor standards to HEVC and its extensions.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In HEVC and other video coding specifications, a video sequence typically includes a series of pictures. Pictures may also be referred to as "frames." In one example approach, a picture may include three sample arrays, denoted $S_L$, $S_{Cb}$, and $S_{Cr}$. In such an example approach, $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). The size of a CTU can be ranges from 16×16 to 64×64 in the HEVC main profile (although technically 8×8 CTU sizes can also be supported). Each of the CTUs may include a coding tree block of luma samples, two corresponding coding tree blocks of chroma samples, and syntax structures used to code the samples of the coding tree blocks. In monochrome pictures or pictures having three separate color planes, a CTU may include a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

To generate a coded CTU, video encoder 20 may recursively perform quad-tree partitioning on the coding tree blocks of a CTU to divide the coding tree blocks into coding blocks, hence the name "coding tree units." A coding block may be an N×N block of samples. A CU may include a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may include a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may include a prediction block of luma samples, two corresponding prediction blocks of chroma samples, and syntax structures used to predict the prediction blocks. In monochrome pictures or pictures having three separate color planes, a PU may include a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU. If video encoder 20 uses inter prediction to generate the predictive blocks of a PU, video encoder 20 may generate the predictive blocks of the PU based on decoded samples of one or more pictures other than the picture associated with the PU.

Each CU is coded with one mode. When a CU is inter coded, the CU may be further partitioned into 2 or 4 prediction units PUs or become just one PU when further partitioning does not apply. When two PUs are present in one CU, the two PUs can be half size rectangles or two rectangle size with ¼ or ¾ size of the CU. When a CU is inter coded, one set of motion information may be present for each PU. In addition, each PU is coded with a unique inter-prediction mode to derive the set of motion information.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block is a rectangular (e.g., square or non-square) block of samples on which the same transform is applied. A transform unit (TU) of a CU may include a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may include a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may include a sequence of Network Abstraction Layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a PPS, a second type of NAL unit may encapsulate an RBSP for a coded slice, a third type of NAL unit may encapsulate an RBSP for SEI messages, and so on. NAL units that encapsulate RBSPs for video coding data (as opposed to RBSPs for parameter sets and SEI messages) may be referred to as VCL NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. In addition, video decoder 30 may inverse quantize coefficient blocks associated with TUs of a current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

The quadtree-binary tree (QTBT) structure, as described in H. Huang, K. Zhang, Y.-W. Huang, S. Lei, "EE2.1: Quadtree plus binary tree structure integration with JEM tools", JVET-00024, June 2016, is adopted in the JEM4 software. In the QTBT structure, a CTB is firstly partitioned by a quadtree structure. The quadtree leaf nodes are further partitioned by a binary tree structure. The binary tree leaf nodes, namely coding blocks (CBs), are used for prediction and transform without any further partitioning. For P and B slices the luma and chroma CTBs in one CTU share the same QTBT structure. For I slice the luma CTB is partitioned into CBs by a QTBT structure, and two chroma CTBs are partitioned into chroma CBs by another QTBT structure.

A CTU (or CTB for I slice), which is the root node of a quadtree, is firstly partitioned by a quadtree, where the quadtree splitting of one node can be iterated until the node reaches the minimum allowed quadtree leaf node size (MinQTSize). If the quadtree leaf node size is not larger than the maximum allowed binary tree root node size (MaxBTSize), it can be further partitioned by a binary tree. The binary tree splitting of one node can be iterated until the node reaches the minimum allowed binary tree leaf node size (MinBTSize) or the maximum allowed binary tree depth (MaxBTDepth). The binary tree leaf node, namely CU (or CB for I slice), will be used for prediction (e.g. intra-picture or inter-picture prediction) and transform without any further partitioning. There are two splitting types in the binary tree splitting: symmetric horizontal splitting and symmetric vertical splitting.

In one example of the QTBT partitioning structure, the CTU size is set to 128×128 (luma samples and corresponding 64×64 Cb/Cr samples), the MinQTSize is set to 16×16, the MaxBTSize is set to 64×64, the MinBTSize (for both width and height) is set to 4, and the MaxBTDepth is set to 4. The quadtree partitioning is applied to the CTU first to generate quadtree leaf nodes. The quadtree leaf nodes may have a size from 16×16 (i.e., the MinQTSize) to 128×128 (i.e., the CTU size). If the leaf quadtree node is 128×128, it will not be further split by the binary tree since the size exceeds the MaxBTSize (i.e., 64×64). Otherwise, the leaf quadtree node will be further partitioned by the binary tree. Therefore, the quadtree leaf node is also the root node for the binary tree and its binary tree depth is defined as 0. When the binary tree depth reaches MaxBTDepth (i.e., 4), it implies no further splitting. When the binary tree node has a width equal to MinBTSize (i.e., 4), it implies no further horizontal splitting. Similarly, when the binary tree node has a height equal to MinBTSize, it implies no further vertical splitting. The leaf nodes of the binary tree, namely CUs, are further processed by prediction and transform without any further partitioning.

Figure 2A:
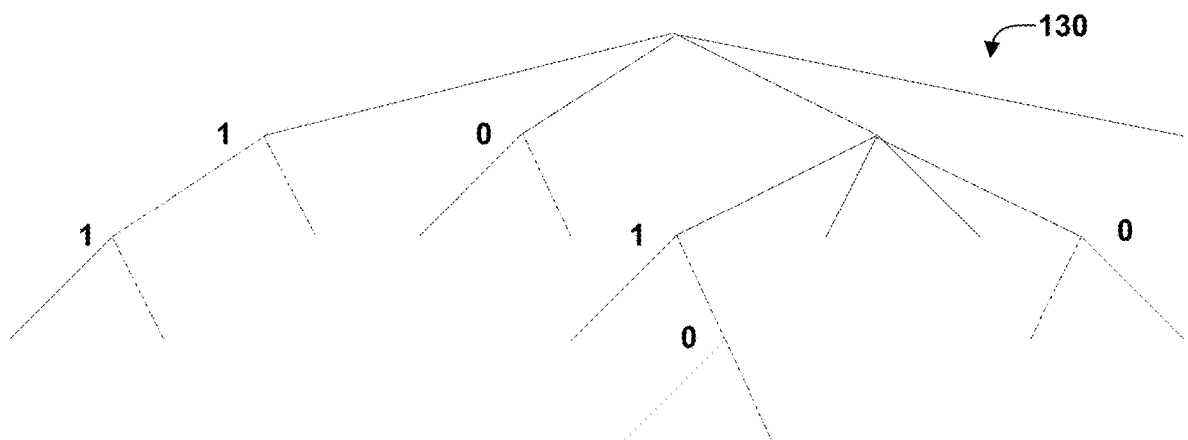
FIGS. 2A and 2B are conceptual diagrams illustrating an example quadtree binary tree (QTBT) structure, and a corresponding coding tree unit (CTU).
Figure 2B:
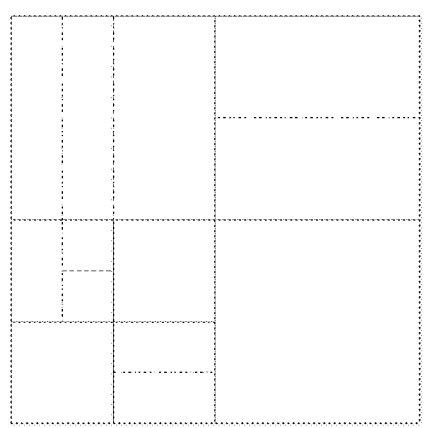

FIGS. 2A and 2B are conceptual diagram illustrating an example QTBT structure 130, and a corresponding CTU 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 20 may encode, and video decoder 30 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 20 may encode, and video decoder 30 may decode, video data, such as prediction and transform data, for CUs represented by terminal leaf nodes of QTBT structure 130.

For I slice, a luma-chroma-separated block partitioning structure is proposed. The luma component of one CTU (i.e., the luma CTB) is partitioned by a QTBT structure into luma CBs, and the two chroma components of that CTU (i.e., the two chroma CTBs) are partitioned by another QTBT structure into chroma CBs.

For P and B slice, the block partitioning structure for luma and chroma is shared. That is, one CTU (including both luma and chroma) is partitioned by one QTBT structure into CUs.

Figure 3:
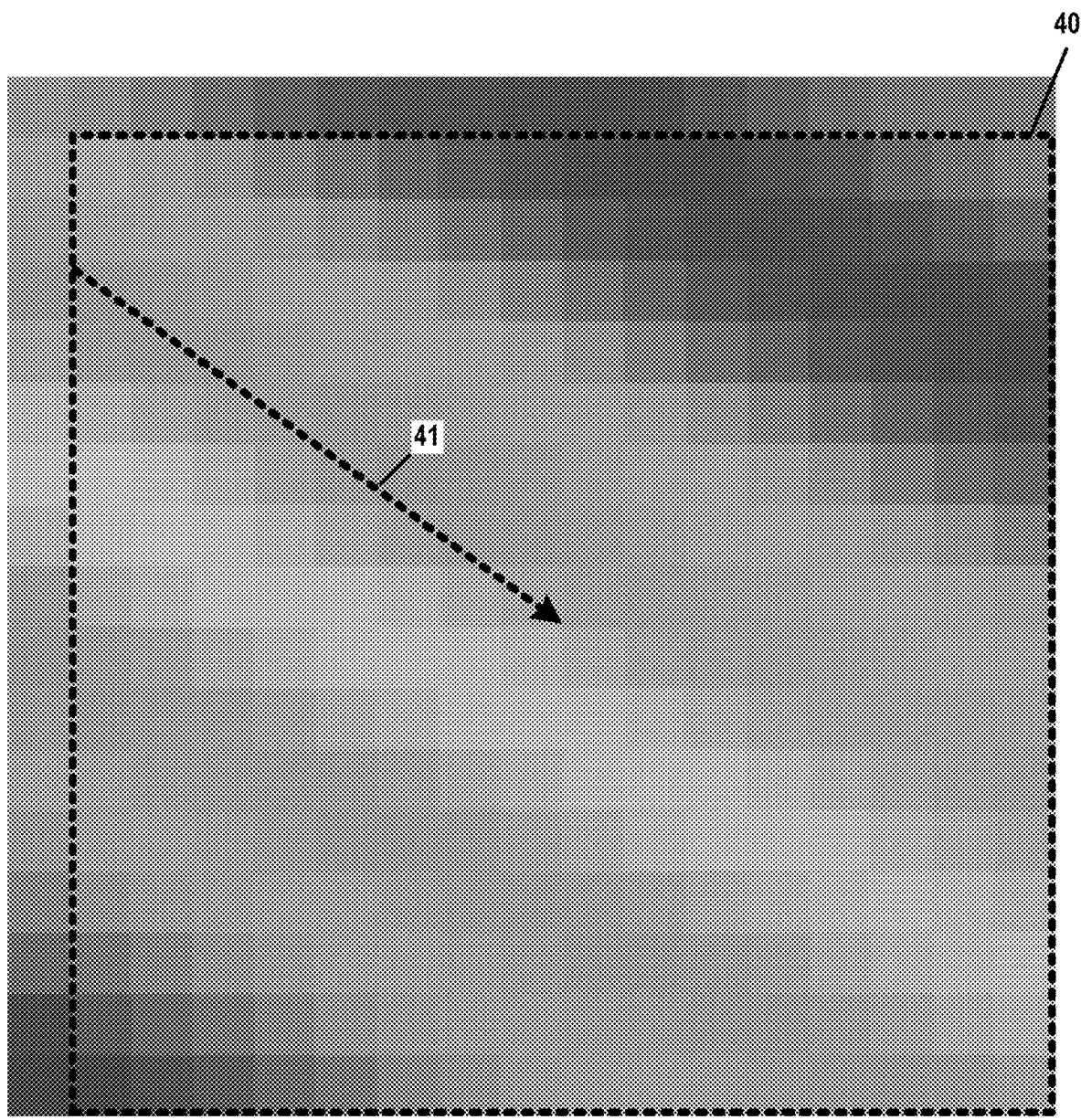
FIG. 3. shows an example of intra prediction for a 16×16 block.

FIG. 3 shows an example of intra prediction for a 16×16 block. When coding a block in an intra prediction mode, the video encoder 20 or video decoder 30 performs image block prediction using spatially neighboring reconstructed image samples. A typical example of intra prediction for a 16×16 image block is shown in FIG. 3. To intra predict 16×16 block 40, video encoder 20 and video decoder 30 predict 16×16 block 40 using the above and left neighboring reconstructed samples (reference samples) along a selected prediction direction (as indicated by arrow 42).

Figure 4:
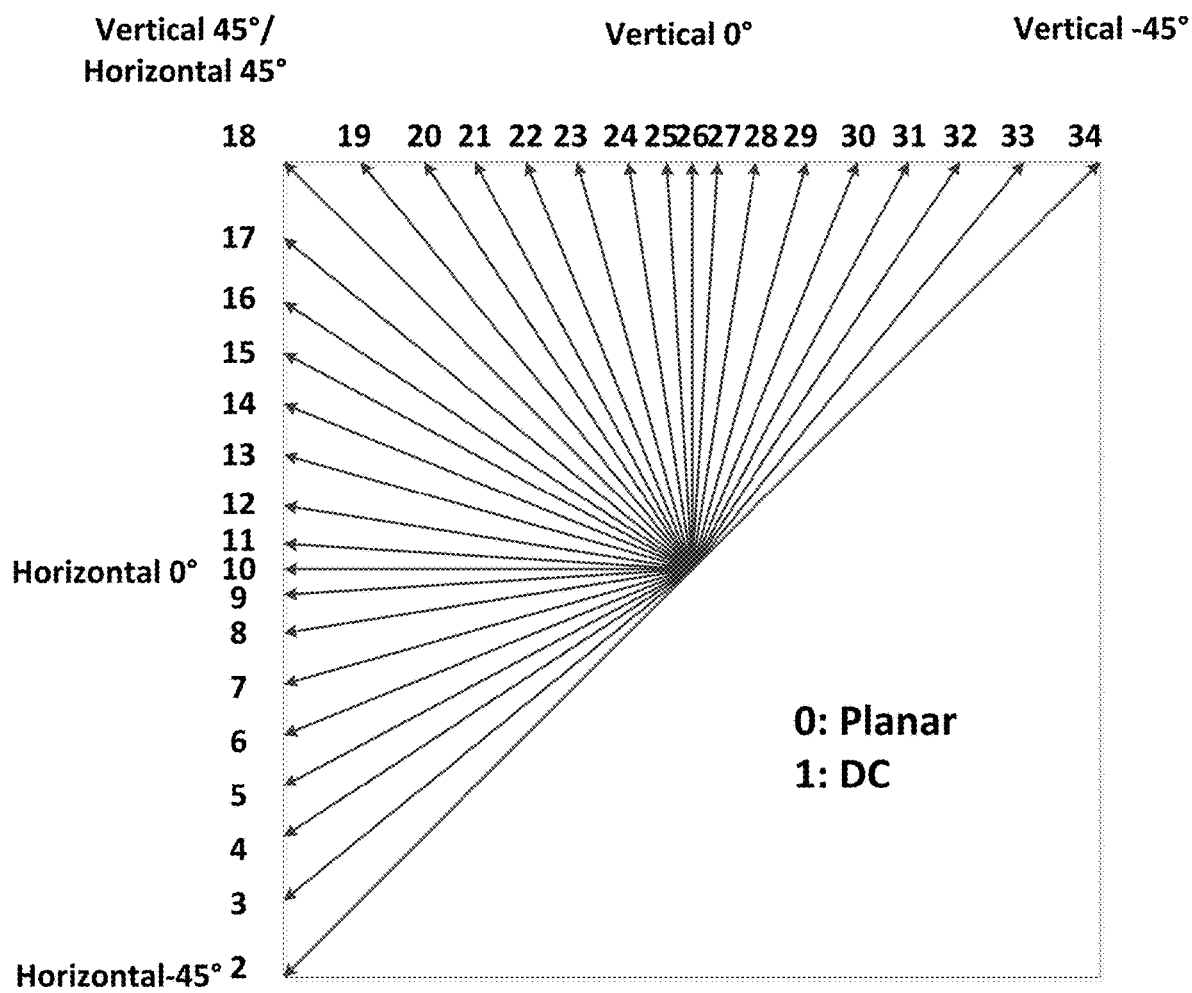
FIG. 4 is a graphical illustration of the 35 Intra prediction modes defined in HEVC.

FIG. 4 shows the 35 intra prediction modes defined in HEVC. In HEVC, for the intra prediction of a luma block, a video encoder 20 and video decoder 30 may select from 35 available modes, including Planar mode, DC mode, and 33 angular modes, as indicated in FIG. 4. It is contemplated that successor standards to HEVC may include more than 35 modes.

In the examples of FIGS. 5A-14, circles with solid lines are intended to represent either pixels being predicted or available pixels. Circles with dashed lines are intended to represent unavailable pixels. Generally speaking, a pixel may include one or more samples. For example, a pixel may include a luma sample and two chroma samples. To the extent this disclosure describes techniques with respect to pixels, it should be understood that the techniques can be applied to samples. For example, the techniques may be applied to some or all samples of the pixel. Similarly, to the extent this disclosure describes techniques with respect to samples, it should be understood that the techniques can be applied to pixels.

Figure 5A:
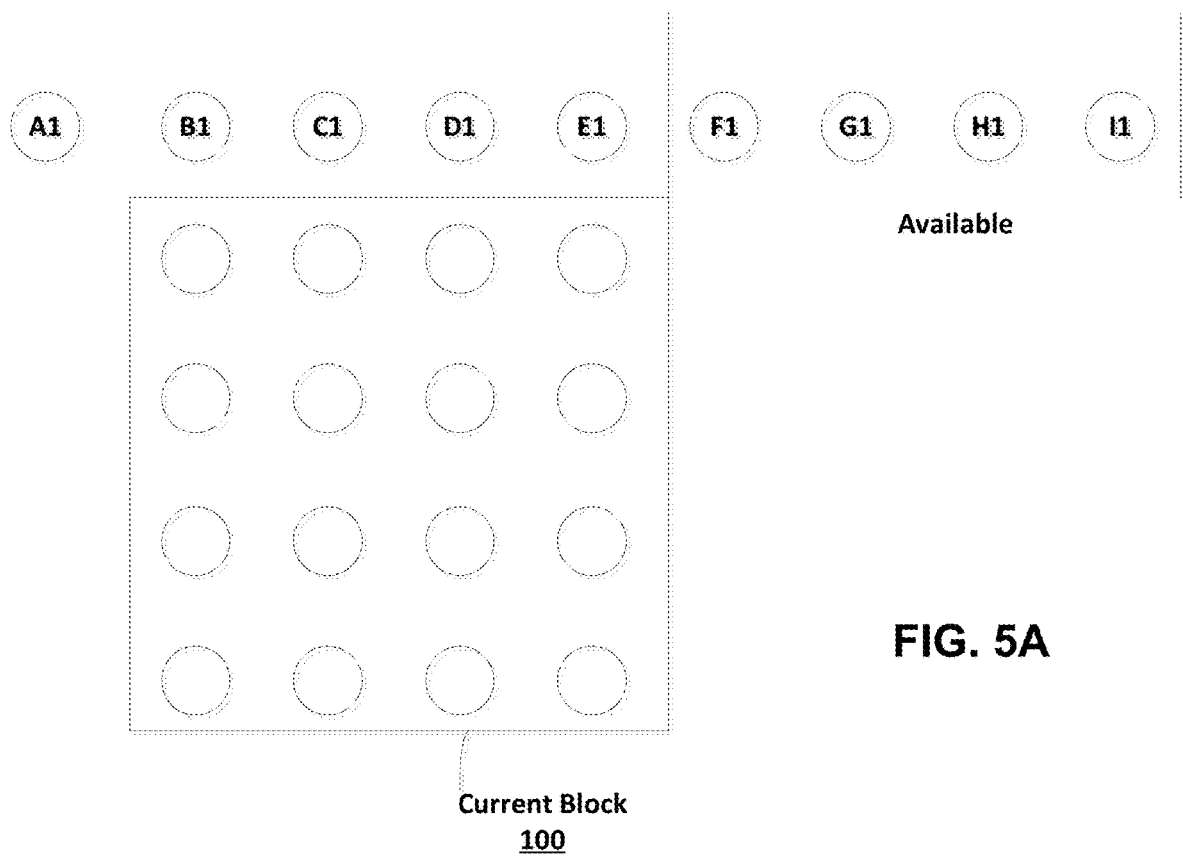
FIGS. 5A-5D show example techniques for padding unavailable neighboring samples.
Figure 5B:
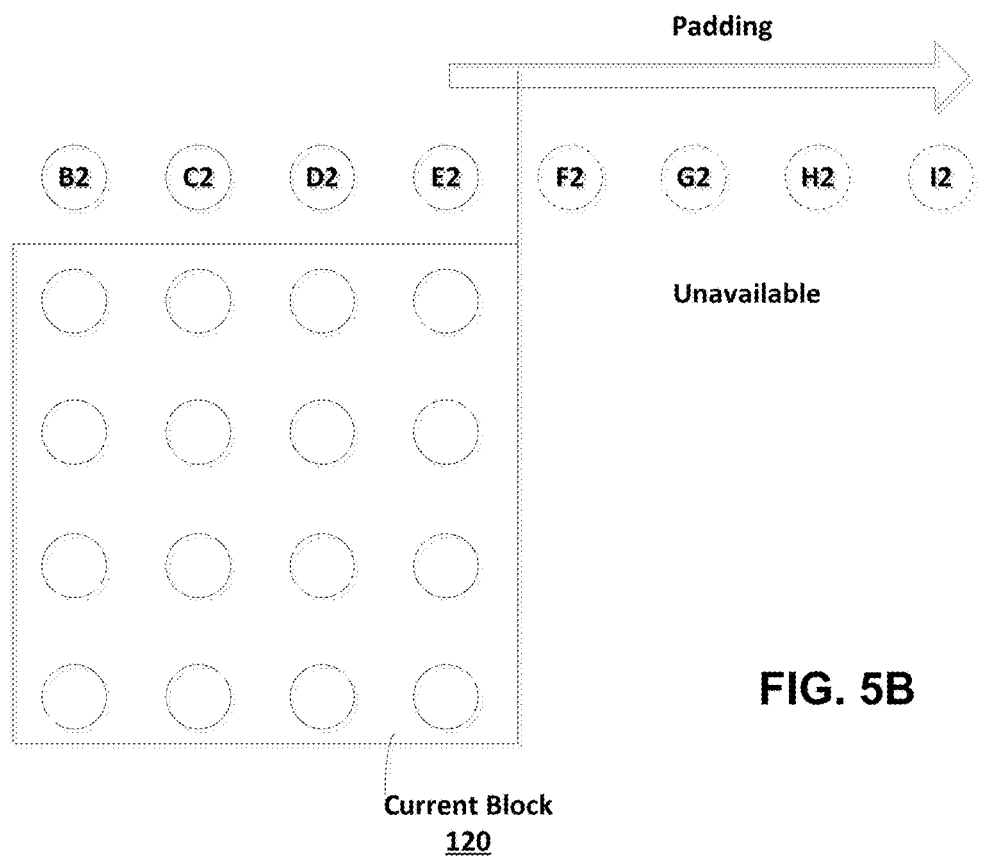

FIGS. 5A-5D show example techniques for padding unavailable neighboring samples. In some cases, neighboring samples used for intra-prediction are available, as shown in FIG. 5A for above neighboring samples and FIG. 5C for left neighboring samples. The reconstructed neighboring samples are used in the intra-prediction process. In some other cases, some neighboring samples used for intra-prediction are unavailable. In such cases, the unavailable neighboring samples are first padded with the adjacent available neighboring pixels, then the padded pixels are used in the intra-prediction process, as shown in FIG. 5B for above neighboring pixels and FIG. 5D for left neighboring samples. In some cases, the padding samples may not reflect the true texture pattern of the unavailable neighboring blocks.

FIG. 5A shows current block 100, which represents a block being predicted by video encoder 20 or video decoder 30. Video encoder 20 and video decoder 30 may predict current block 120 using above neighboring samples A1-I1, which in the example of FIG. 5A are all available, meaning neighboring samples have already been reconstructed. FIG. 5B shows current block 120, which represents a block being predicted by video encoder 20 or video decoder 30. Video encoder 20 and video decoder 30 may predict current block 120 using above neighboring samples A2-I2. In the example of FIG. 5B, above neighboring samples A2-E2 are all available, meaning neighboring samples A2-E2 have already been reconstructed, while above neighboring samples F2-I2 are all unavailable, meaning neighboring samples F2-I2 have not yet been reconstructed. As neighboring samples F2-I2 are not yet reconstructed, video encoder 20 and video decoder 30 may determine values for neighboring samples F2-I2 using padding. Video encoder 20 and video decoder 30 may, for example, set the values of neighboring samples F2-I2 equal to the value of above neighboring sample E2 or may determine values for neighboring samples F2-I2 in some other manner.

Figure 5D:
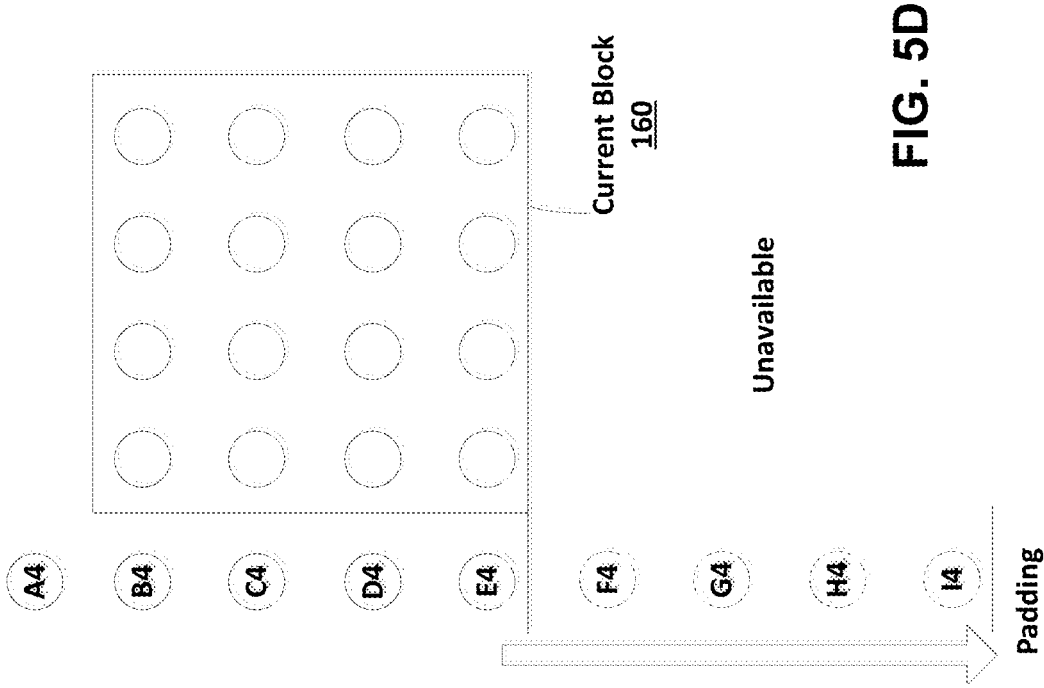
Figure 5C:
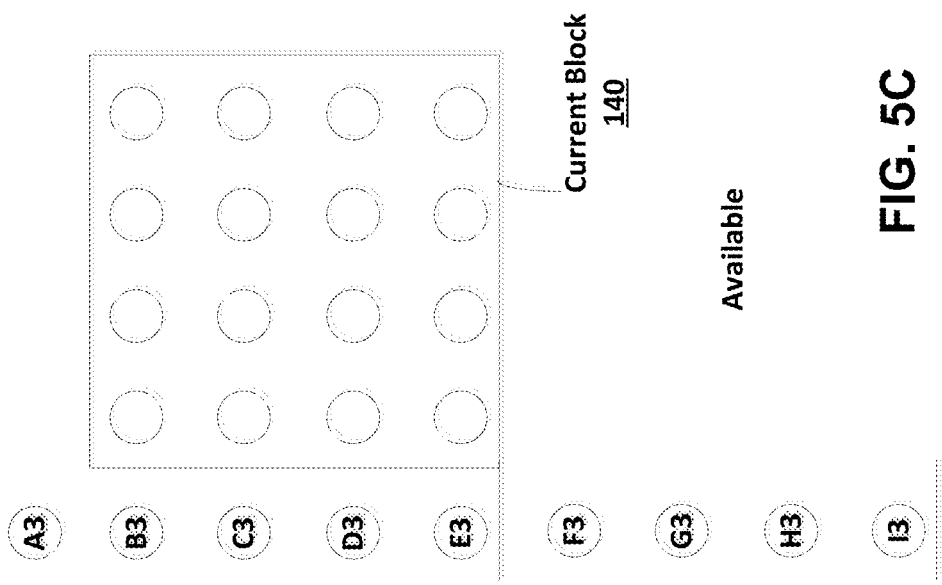

FIG. 5C shows current block 140, which represents a block being predicted by video encoder 20 or video decoder 30. Video encoder 20 and video decoder 30 may predict current block 140 using left neighboring samples A3-I3, which in the example of FIG. 5C are all available, meaning neighboring samples A3-I3 have already been reconstructed. FIG. 5D shows current block 160, which represents a block being predicted by video encoder 20 or video decoder 30. Video encoder 20 and video decoder 30 may predict current block 160 using left neighboring samples A4-I4. In the example of FIG. 5D, left neighboring samples A4-E4 are all available, meaning neighboring samples A4-E4 have already been reconstructed, while left neighboring samples F4-I4 are all unavailable, meaning neighboring samples F4-I4 have not yet been reconstructed. As neighboring samples F4-I4 are not yet reconstructed, video encoder 20 and video decoder 30 may determine values for neighboring samples F4-I4 using padding. Video encoder 20 and video decoder 30 may, for example, set the values of neighboring samples F4-I4 equal to the value of left neighboring sample E4 or may determine values for neighboring samples F4-I4 in some other manner.

Predicting a current block of video data from padded samples may result in inferior coding quality, in terms of the rate-distortion tradeoff achieved by the compression, when compared to predicting a current block of video data from available, reconstructed samples. To potentially resolve or avoid the problems introduced by padding, this disclosure describes several techniques for using intra prediction with far neighboring pixels. The described techniques may be applied individually or, unless stated otherwise, in any combination.

According to one technique of this disclosure, video encoder 20 and video decoder 30 may use far neighboring pixels in the intra-prediction process for the current block. In this context, far neighboring pixels may refer to pixels not adjacent to the current block. Far neighboring pixels may belong to neighboring blocks adjacent to the current block. In some examples, far neighboring pixels may belong to far neighboring blocks that are not adjacent to the current block, meaning the far neighboring blocks do not share a border with the current block. In some examples, far neighboring pixels may belong to blocks in a reference frame identified by a motion vector.

In some examples, the availability of the neighboring blocks and far neighboring blocks may be used to determine whether far neighboring pixels should be used in the intra-prediction process for the current block; which far neighboring should be used in the intra-prediction process for the current block; and how far neighboring should be used in the intra-prediction process for the current block.

In some examples, far neighboring pixels may be identified by using template matching. That is, the available neighboring samples are used as the template, and this template is compared to the reconstructed image region and the best match is identified with minimum cost, and the samples to be padded are derived by the available sample located at the corresponding positions of the best match.

In some examples, the intra-prediction mode of the current block may be used to determine whether far neighboring pixels should be used in the intra-prediction process for the current block; which far neighboring should be used in the intra-prediction process for the current block; and how far neighboring should be used in the intra-prediction process for the current block.

Figure 6:
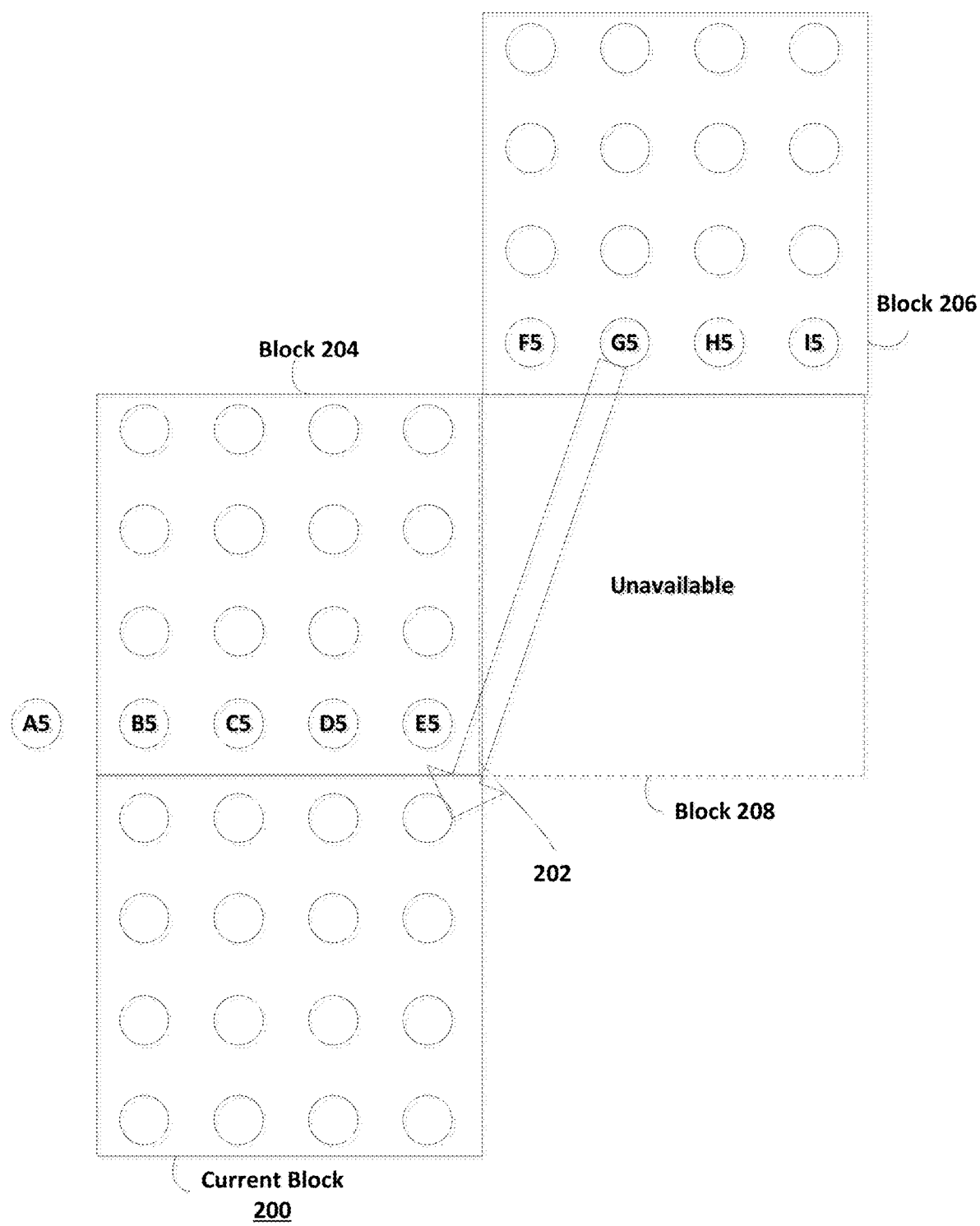
FIG. 6 shows an example of intra-prediction from far neighboring pixels according to a technique of this disclosure.

FIG. 6 shows an example of intra-prediction from far neighboring pixels. More specifically, FIG. 6 shows an example where current block 200 is being intra predicted using an angular intra prediction mode represented by arrow 202, by video encoder 20 or video decoder 30, for example. In the example of FIG. 6, neighboring block 204 and block 206 are available, but block 208 is unavailable, for example, because current block 200 is encoded/decoded before block 208. In such a case, video encoder 20 and video decoder 30 may use pixels F5, G5, H5, and I5 in the intra-prediction process for current block 200 if the prediction direction is between Vertical 0° to Vertical −45°, or between modes 27 and mode 34 inclusively as shown in FIG. 4.

Figure 7A:
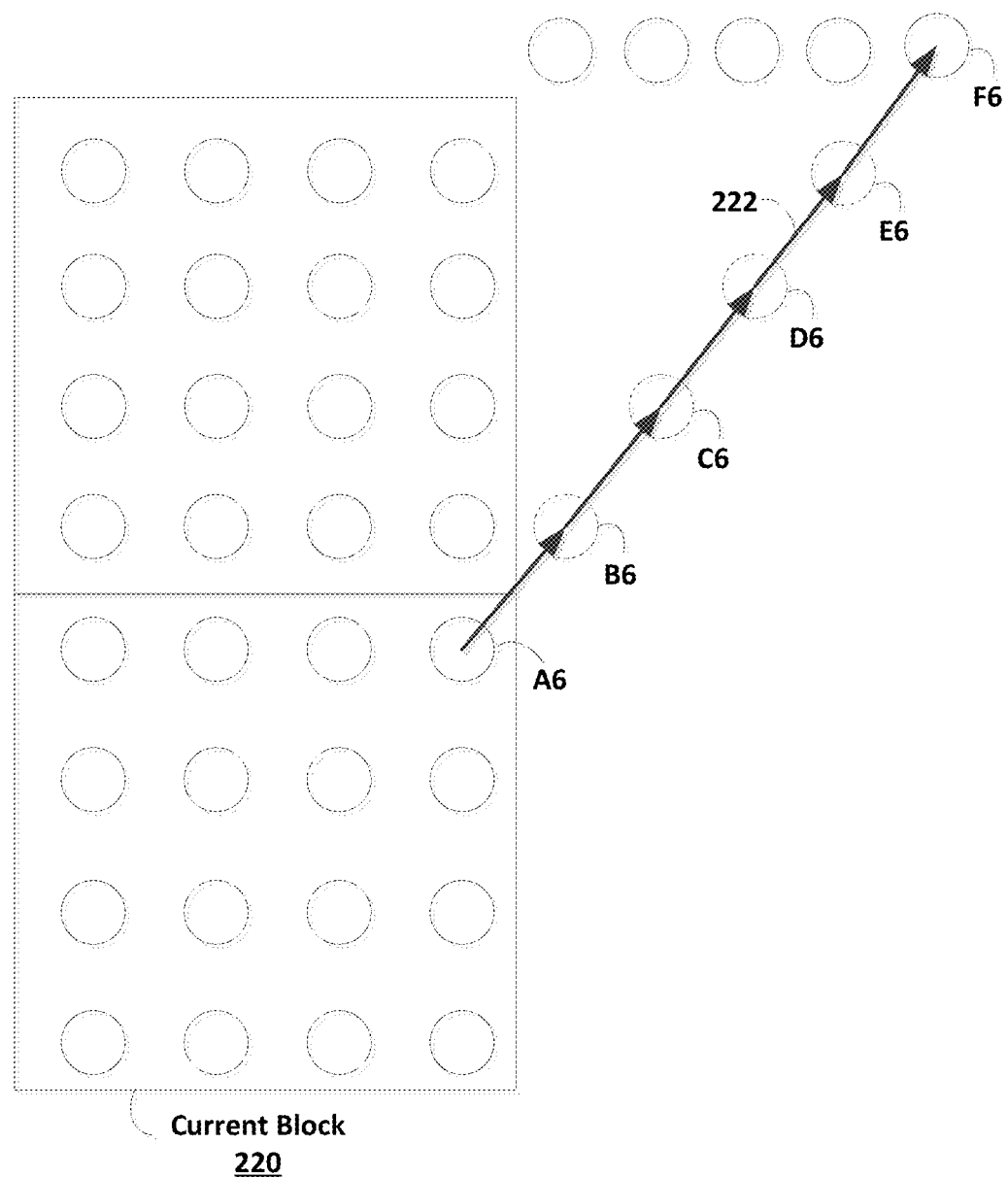
FIGS. 7A and 7B show example techniques for locating far neighboring pixels according to techniques of this disclosure.
Figure 7B:
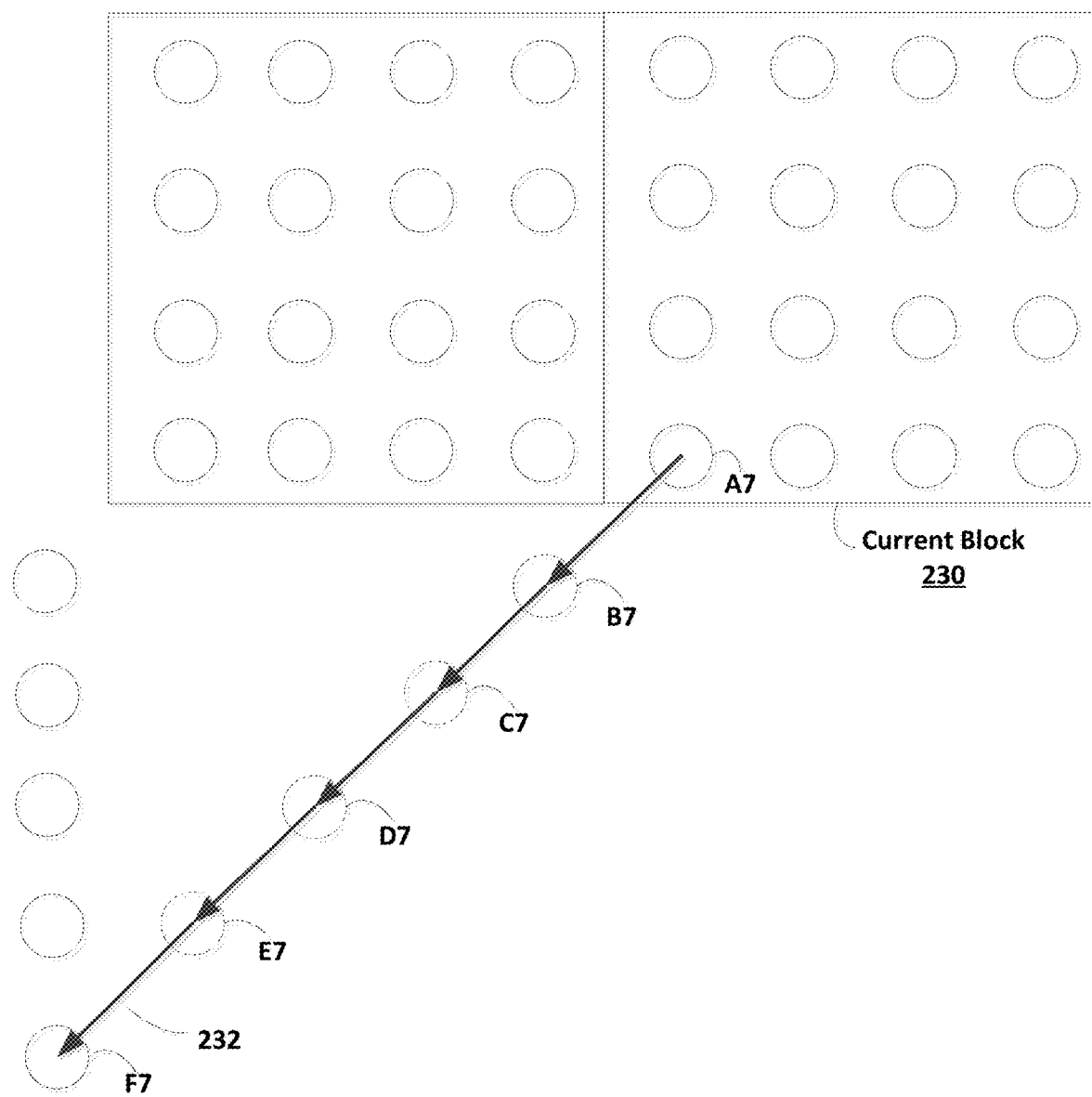

FIGS. 7A and 7B show examples of locating far neighboring pixels. FIGS. 7A and 7B show examples of how video encoder 20 and video decoder 30 may use far neighboring pixels to predict a pixel in a current block by locating a first available pixel on the line staring from the pixel along the direction defined by the intra-prediction mode.

FIG. 7A shows an example of how video encoder 20 and video decoder 30 may intra predict current block 220 by locating far neighboring pixels for pixel A6 if the intra-prediction direction is Vertical −45°. Along line 222, which represents a line from pixel A6 along Vertical −45°, pixels B6, C6, D6, and E6 are all unavailable. Pixel F6 is the first available pixel on line 222. Video encoder 20 and video decoder 30 may use pixel F6 to be the far neighboring pixel used to predict pixel A6. Thus, when determining a predictive block for current block 220, video encoder 20 and video decoder 30 may set the value for pixel A6 equal to the value of pixel F6.

FIG. 7B shows another example of how video encoder 20 and video decoder 30 may intra predict current block 230 by locating far neighboring pixels for pixel A7 if the intra-prediction direction is Horizontal −45°. Along line 232, which represents a line from pixel A7 along Horizontal −45°, pixels B7, C7, D7 and E7 are all unavailable. Pixel F7 is the first available pixel on line 232. Video encoder 20 and video decoder 30 may use pixel F7 to be the far neighboring pixel used to predict pixel A7. Thus, when determining a predictive block for current block 230, video encoder 20 and video decoder 30 may set the value for pixel A7 equal to the value of pixel F7.

Figure 8A:
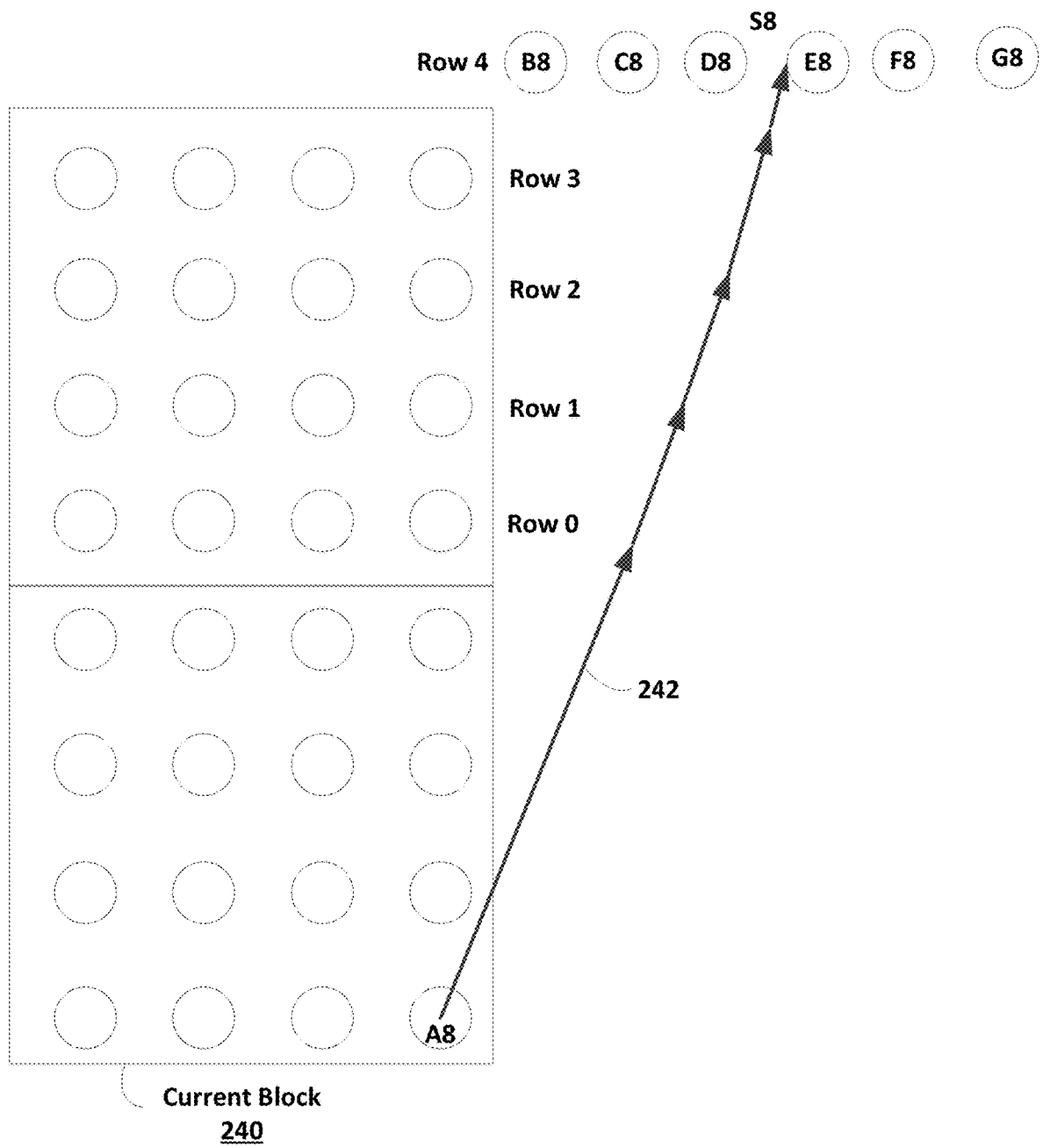
FIGS. 8A and 8B show example techniques for locating far neighboring sub-pixels.
Figure 8B:
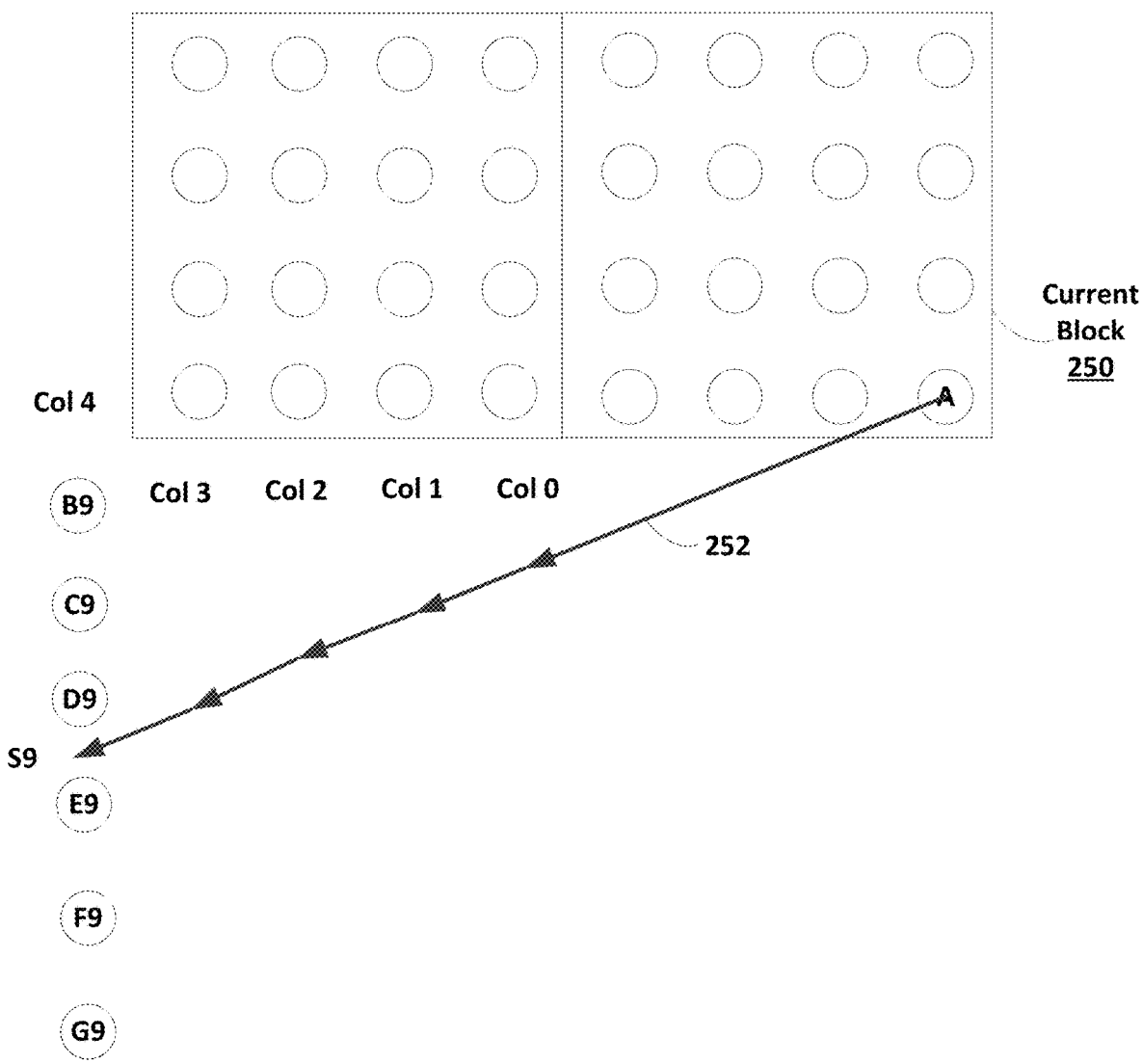

FIGS. 8A and 8B show examples of locating far neighboring sub-pixels. Video encoder 20 and video decoder 30 may predict a pixel in a current block using a far neighboring pixel or sub-pixel that is located in the first available row or column on the line staring from the pixel and along the direction defined by the intra-prediction mode. The sample value of the sub-pixel can be derived from pixels in the first available row or column near to the sub-pixel. For example, the sample value can be calculated by an interpolation filter applied on pixels in the first available row or column near to the sub-pixel. An interpolation filter may, for example, be used to determine a weighted average of nearby pixel values. In another example, the sample value can be calculated as the value of the pixel in the first available row or column nearest to the sub-pixel.

FIG. 8A shows an example of how video encoder 20 and video decoder 30 may intra predict current block 240 by locating far neighboring pixels for pixel A8 if the intra-prediction direction angle is between Vertical 0° and Vertical −45°. Along line 242, which represents a line from pixel A8 in the direction of the intra-prediction direction angle, Row 0, Row 1, Row 2 and Row 3 are all unavailable, and Row 4 is the first available row crossing line 242 at sub-pixel S8. Video encoder 20 and video decoder 30 may determine a sample value for S8 by setting S8 equal to the nearest pixel (i.e., E8 in the example of FIG. 8A) or by calculating a sample value by applying an interpolation filter to pixels D8 and E8. In other examples, video encoder 20 and video decoder 30 may calculated a value for S8 by applying an interpolation filter to pixels C8, D8, E8, and F8 or by applying an interpolation filter to pixels B8, C8, D8, E8, F8, and G8.

FIG. 8B shows an example of how video encoder 20 and video decoder 30 may intra predict current block 250 by locating far neighboring pixels for pixel A9 if the intra-prediction direction angle is between Horizontal 0° and Horizontal −45°. Along line 252, which represents a line from pixel A9 in the direction of the intra-prediction direction angle, Column 0, Column 1, Column 2 and Column 3 are all unavailable, and Column 4 is the first available row crossing line 252 at sub-pixel S9. Video encoder 20 and video decoder 30 may determine a sample value for S9 by setting S9 equal to the nearest pixel (i.e., E9 in the example of FIG. 8B) or by calculating a sample value by applying an interpolation filter to pixels D9 and E9. In other examples, video encoder 20 and video decoder 30 may calculate a value for S9 by applying an interpolation filter to pixels C9, D9, E9, and F9 or by applying an interpolation filter to pixels B9, C9, D9, E9, F9, and G9.

According to another technique of this disclosure, video encoder 20 and video decoder 30 may use far neighboring pixels to pad the unavailable neighboring pixels used for the intra-prediction process for the current picture. The padded unavailable neighboring pixels are then used in the intra-prediction process for the current block.

In some examples, far neighboring pixels means pixels not adjacent to the current block. Far neighboring pixels may belong to neighboring blocks adjacent to the current block. In some examples, far neighboring pixels may belong to far neighboring blocks not adjacent to the current block. In some examples, far neighboring pixels may belong to blocks in a reference frame identified by a motion vector.

In some examples, video encoder 20 and video decoder 30 may use the availability of the neighboring blocks and far neighboring blocks to determine whether far neighboring pixels should be used in the padding process for the current block; which far neighboring should be used in the padding process for the current block; and how far neighboring should be used in the padding process for the current block.

In some examples, video encoder 20 and video decoder 30 may identify far neighboring pixels by using template matching. That is, the available neighboring samples are used as the template, and this template is compared to the reconstructed image region and the best match is identified with minimum cost, and the samples to be padded are derived by the available sample located at the corresponding positions of the best match.

In some examples, video encoder 20 and video decoder 30 may use the intra-prediction mode of the current block to determine whether far neighboring pixels should be used in the padding process for the current block; which far neighboring should be used in the padding process for the current block; and how far neighboring should be used in padding process for the current block.

Figure 9:
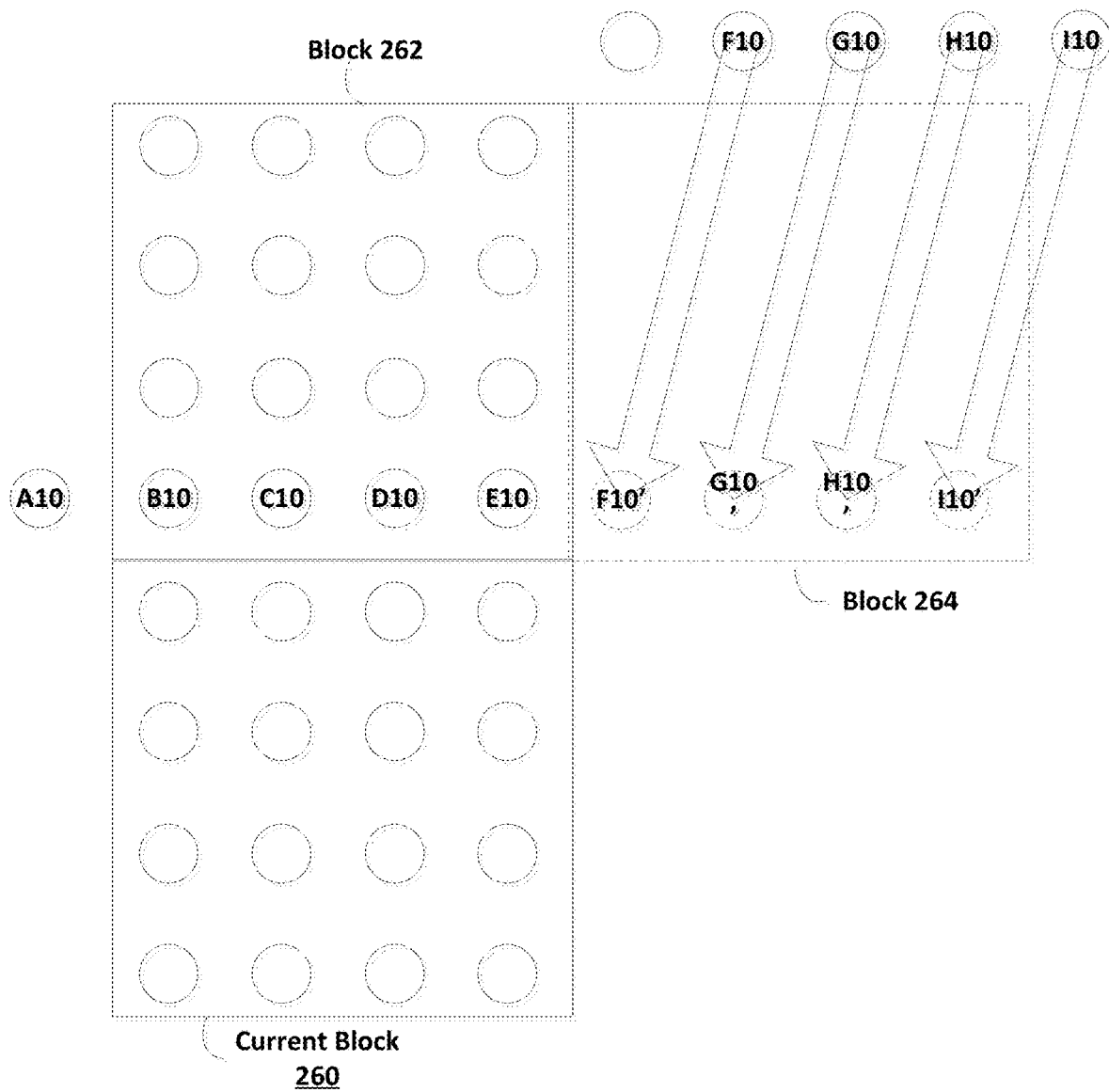
FIG. 9 shows an example technique for padding using far neighboring pixels.

FIG. 9 shows an example of how video encoder 20 and video decoder 30 may intra predict current block 260 by using padding from far neighboring pixels F10-I10. Block 262 represents a block of available pixels, and block 264 represents a block of unavailable pixels. In the example of FIG. 9, neighboring pixels F10', G10', H10' and I10' are located in block 264 and are thus unavailable. In such a case, video encoder 20 and video decoder 30 may use available far neighboring pixels F10, G10, H10, and I10 to pad F10', G10', H10' and I10'. Then, video encoder 20 and video decoder 30 can use the padded F10', G10', H10' and I10' in the intra-prediction process for current block 260.

According to another technique of this disclosure, video encoder 20 and video decoder 30 may use far neighboring pixels to pad one unavailable neighboring pixel of a current block. The far neighboring pixel may be located by the first available pixel on a line staring from the unavailable pixel. The direction of the line may be defined by the angle of the intra-prediction mode.

Figure 10A:
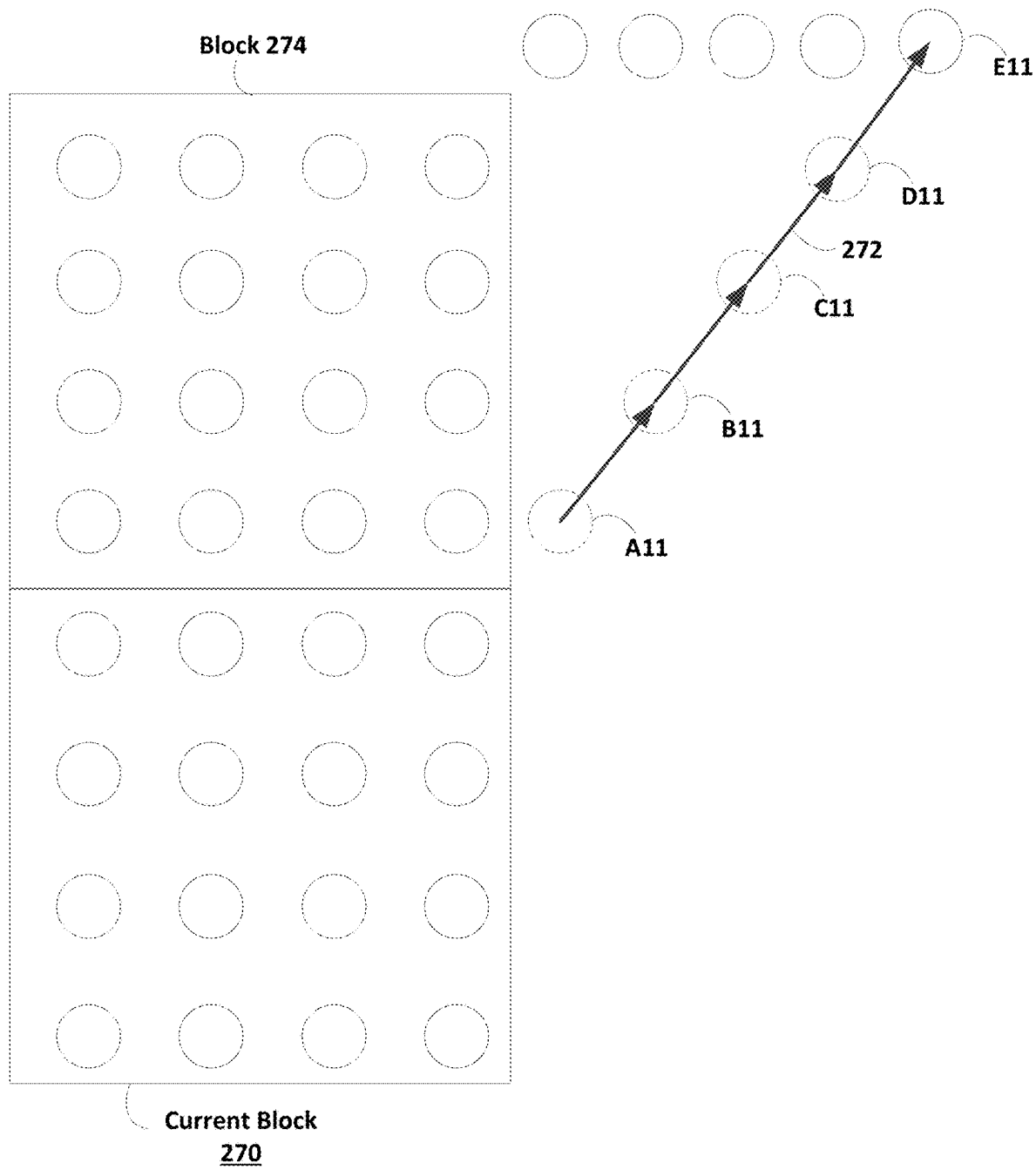
FIGS. 10A and 10B show example techniques for locating far neighboring pixels to use for padding.
Figure 10B:
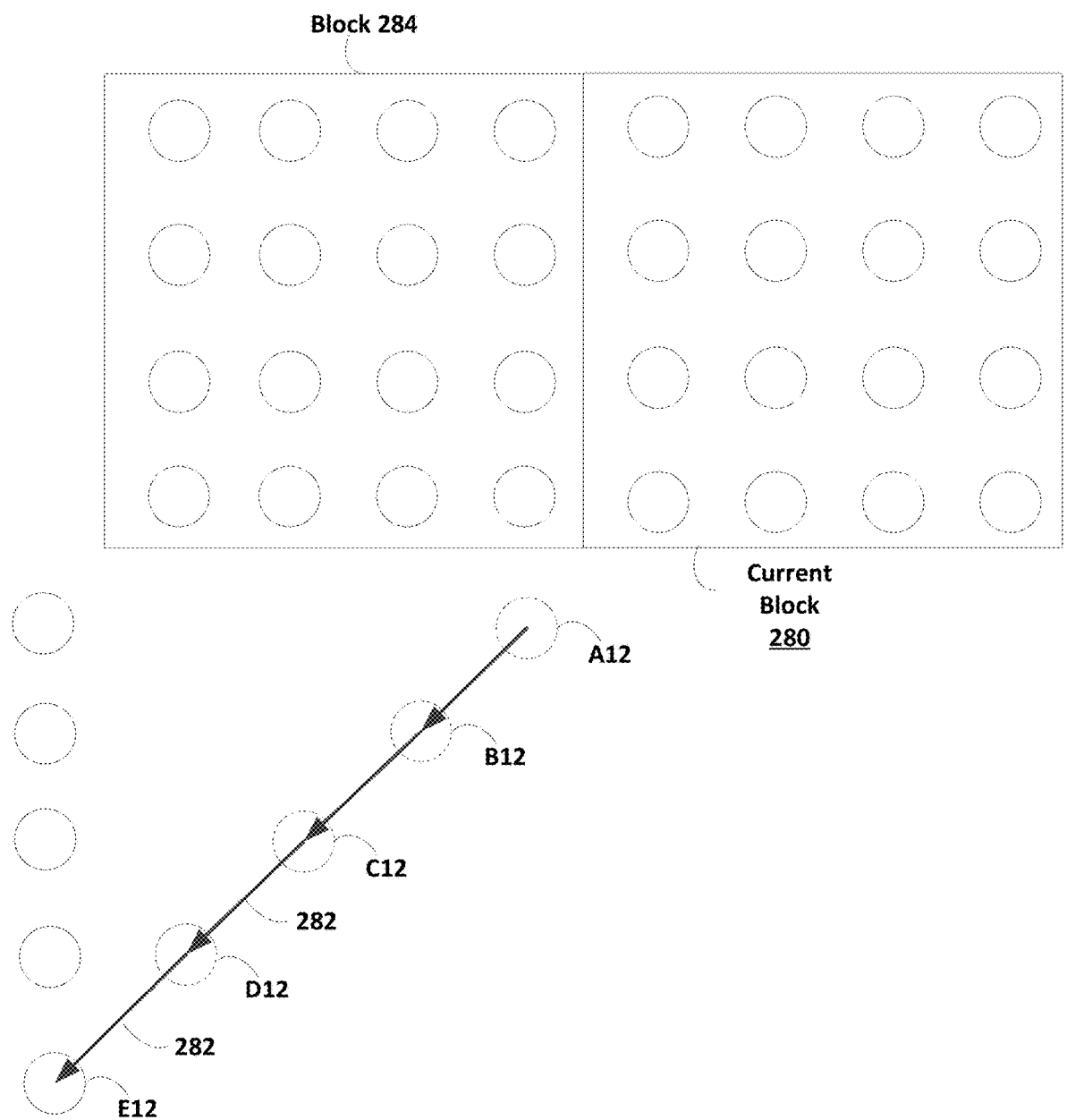

FIGS. 10A and 10B show example techniques for locating far neighboring pixels to use for padding. FIG. 10A shows an example of how video encoder 20 and video decoder 30 may intra predict current block 270 using far neighboring pixels to pad unavailable pixel A11 if the intra-prediction direction is Vertical −45°. Block 274 represents an above-neighboring block of current block 270. The pixels in block 274 are available. On line 272, which represents a line from pixel A11 in the Vertical −45° direction, Pixel B11, C11 and D11 are all unavailable. Pixel E11 is the first available pixel on line 272. Video encoder 20 and video decoder 30 may set the value for pixel A11 to be equal to the value for pixel E11.

FIG. 10B shows an example of how video encoder 20 and video decoder 30 may intra predict current block 280 using far neighboring pixels to pad unavailable pixel A12 if the intra-prediction direction is Horizontal −45°. Block 284 represents a left neighboring block of current block 280. The pixels in block 284 are available. On line 282, which represents a line from pixel A12 in the Horizontal −45° direction, Pixel B12, C12, and D12 are all unavailable. Pixel E12 is the first available pixel on line 282. Video encoder 20 and video decoder 30 may set the value for pixel A12 to be equal to the value for pixel E12.

According to another technique of this disclosure, a far neighboring pixel or sub-pixel to pad one unavailable neighboring pixel A used for the intra-prediction process for the current block can be located in the first available row or column on the line staring from the pixel A along the direction defined by the intra-prediction mode. The sample value of the sub-pixel can be derived from pixels in the first available row or column near to the sub-pixel. For example, it can be calculated by an interpolation filter applied on pixels in the first available row or column near to the sub-pixel. In another example, it can be calculated as the value of the pixel in the first available row or column nearest to the sub-pixel.

Figure 11A:
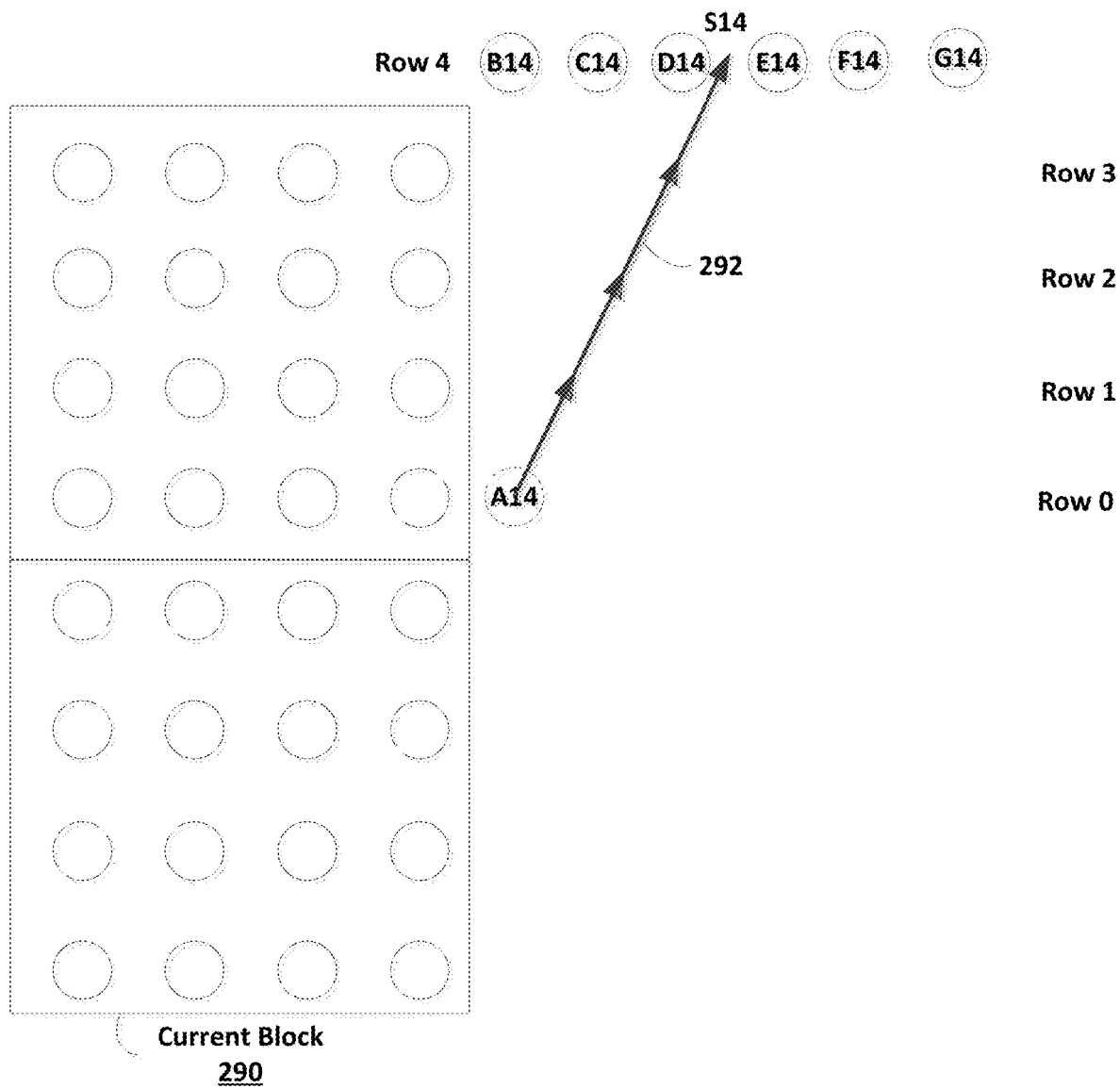
FIGS. 11A and 11B show example techniques for locating far neighboring sub-pixels according to techniques of this disclosure.
Figure 11B:
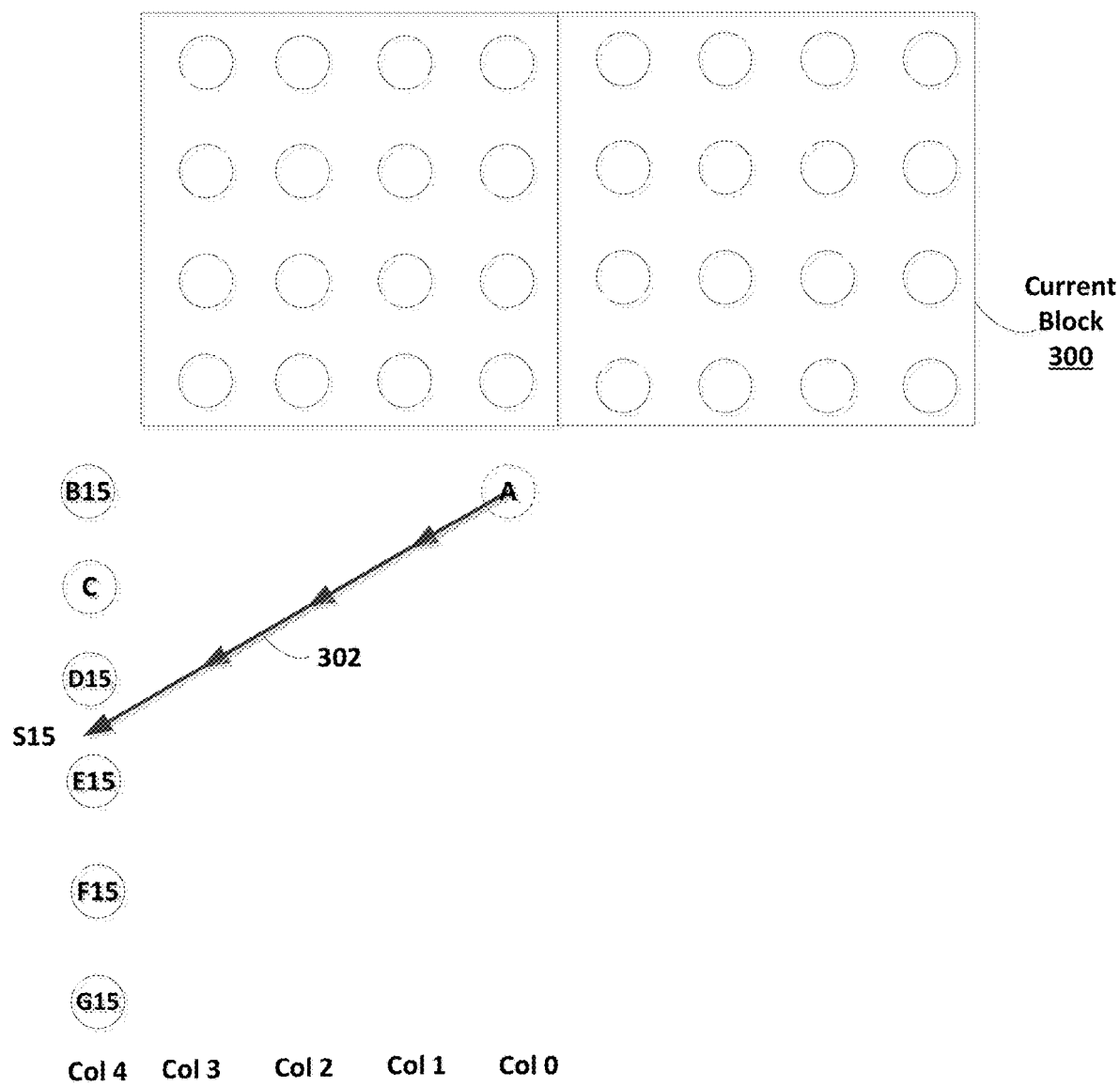

FIGS. 11A and 11B show examples of locating far neighboring sub-pixels. As shown in FIGS. 8A and 8B, video encoder 20 and video decoder 30 may predict a pixel in a current block using a far neighboring pixel or sub-pixel that is located in the first available row or column on the line staring from the pixel and along the direction defined by the intra-prediction mode. The sample value of the sub-pixel can be derived from pixels in the first available row or column near to the sub-pixel. For example, the sample value can be calculated by an interpolation filter applied on pixels in the first available row or column near to the sub-pixel. In another example, the sample value can be calculated as the value of the pixel in the first available row or column nearest to the sub-pixel.

FIG. 11A shows an example of how video encoder 20 and video decoder 30 may intra predict current block 290 by determining a value for unavailable pixel A13 using far neighboring pixels if the intra-prediction direction angle is between Vertical 0° and Vertical −45°. Along line 292, which represents a line from pixel A13 in the direction of the intra-prediction direction angle, Row 0, Row 1, Row 2 and Row 3 are all unavailable, and Row 4 is the first available row crossing line 292 at sub-pixel S13. Video encoder 20 and video decoder 30 may determine a sample value for S13 by setting S13 equal to the nearest pixel (i.e., E13 in the example of FIG. 11A) or by calculating a sample value by applying an interpolation filter to pixels D13 and E13. In other examples, video encoder 20 and video decoder 30 may calculated a value for S13 by applying an interpolation filter to pixels C13, D13, E13, and F13 or by applying an interpolation filter to pixels B13, C13, D13, E13, F13, and G13. Video encoder 20 and video decoder 30 may then use the value determined for pixel A13 to determine pixel values for pixels of current block 290.

FIG. 11B shows an example of how video encoder 20 and video decoder 30 may intra predict current block 300 by determining a value for unavailable pixel A14 using far neighboring pixels if the intra-prediction direction angle is between Horizontal 0° and Horizontal −45°. Along line 302, which represents a line from pixel A14 in the direction of the intra-prediction direction angle, Column 0, Column 1, Column 2, and Column 3 are all unavailable, and Column 4 is the first available row crossing line 302 at sub-pixel S14. Video encoder 20 and video decoder 30 may determine a sample value for S14 by setting S14 equal to the nearest pixel (i.e., E14 in the example of FIG. 11B) or by calculating a sample value by applying an interpolation filter to pixels D14 and E14. In other examples, video encoder 20 and video decoder 30 may calculated a value for S14 by applying an interpolation filter to pixels C14, D14, E14, and F14 or by applying an interpolation filter to pixels B14, C14, D14, E14, F14, and G14. Video encoder 20 and video decoder 30 may then use the value determined for pixel A14 to determine pixel values for pixels of current block 300.

According to another technique of this disclosure, video encoder 20 and video decoder 30 may calculate the padded value of an unavailable neighboring pixel used for the intra-prediction process for the current block as a combination of the padded value from adjacent available neighboring pixels as shown in FIGS. 5A-5D, and the padded value from far neighboring pixels as shown in FIGS. 10 and 11. For example, video encoder 20 and video decoder 30 may calculate the padding value of an unavailable neighboring pixel used for the intra-prediction process for the current block as a weighted sum of the padded value from adjacent available neighboring pixels as shown in FIGS. 5A-5D, and the padded value from far neighboring pixels as shown in FIGS. 10 and 11. In one example, the weighting value can be a fixed number such as ½. In another example, the weighting value is adaptive depending on different pixel positions.

Figure 12:
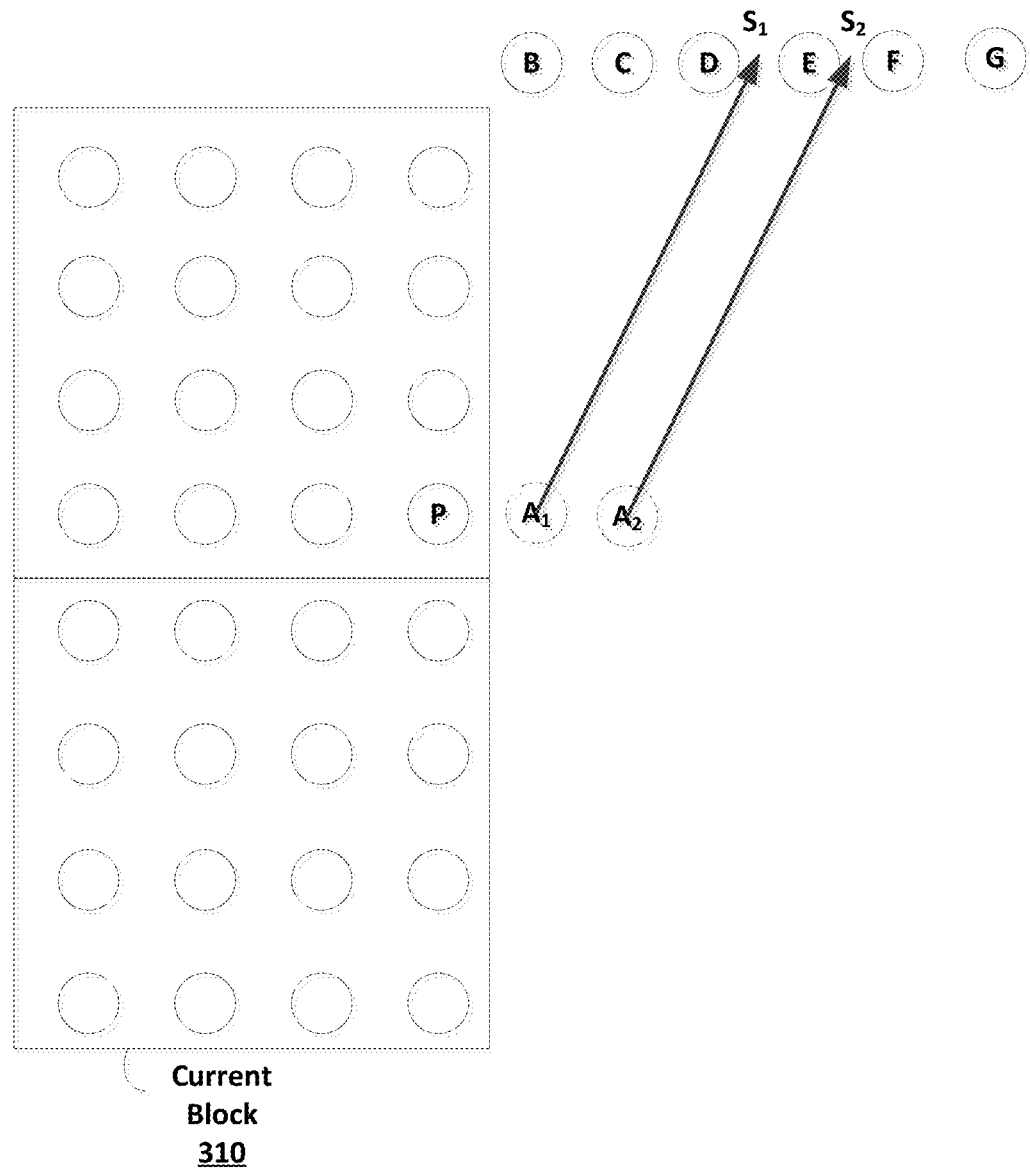
FIG. 12 shows an example technique for combining padding from far neighboring pixels and near neighboring pixels.

FIG. 12 shows an example of combining padding from far neighboring pixels and near neighboring pixels to intra predict current block 310. $A_1$ and $A_2$ represent two unavailable neighboring pixels used for the intra-prediction process for the current block. $A_1$ and $A_2$ can be padded from the available near neighboring pixel P as in HEVC; or $A_1$ and $A_2$ can be padded from the sub-pixels $S_1$ and $S_2$ interpolated by available far neighboring pixels proposed in this document. In some examples, Padded_Value($A_1$)=w11×Value($S_1$)+w12×Value(P), Padded_Value($A_2$)=w21×Value($S_2$)+w22×Value(P). Padded_Value(X) represents the padded value of pixel X.

In one example, Value(X) represents the reconstructed value of pixel X. In another example, Value(X) represents the filtered reconstructed value of pixel X. In another example, w11=w12=w21=w22=1/2, and in another example, w11<=w21, w12>=w22. For example, w11=1/4, w12=3/4 and w21=w22=1/2;

In one example, Padded_Value($A_x$)=wx1×Value($S_x$)+wx2×Value(P). As x increases (meaning $A_x$ is further from P), wx1 increases but wx2 decreases with the constraint that wx1+wx2=1. For example, $$\begin{cases} wx1 = x/M \\ wx2 = (M-x)/M \end{cases} \text{if } 0 < x < M$$

$$\begin{cases} wx1 = 1 \\ wx2 = 0 \end{cases} \text{if } x >= M$$

where M is an integer such as 8 or 16.

According to another technique of this disclosure, the padded pixels are filtered with their neighboring padded or available neighboring pixels. The filtered pixels are used in the intra-prediction process.

Figure 13:
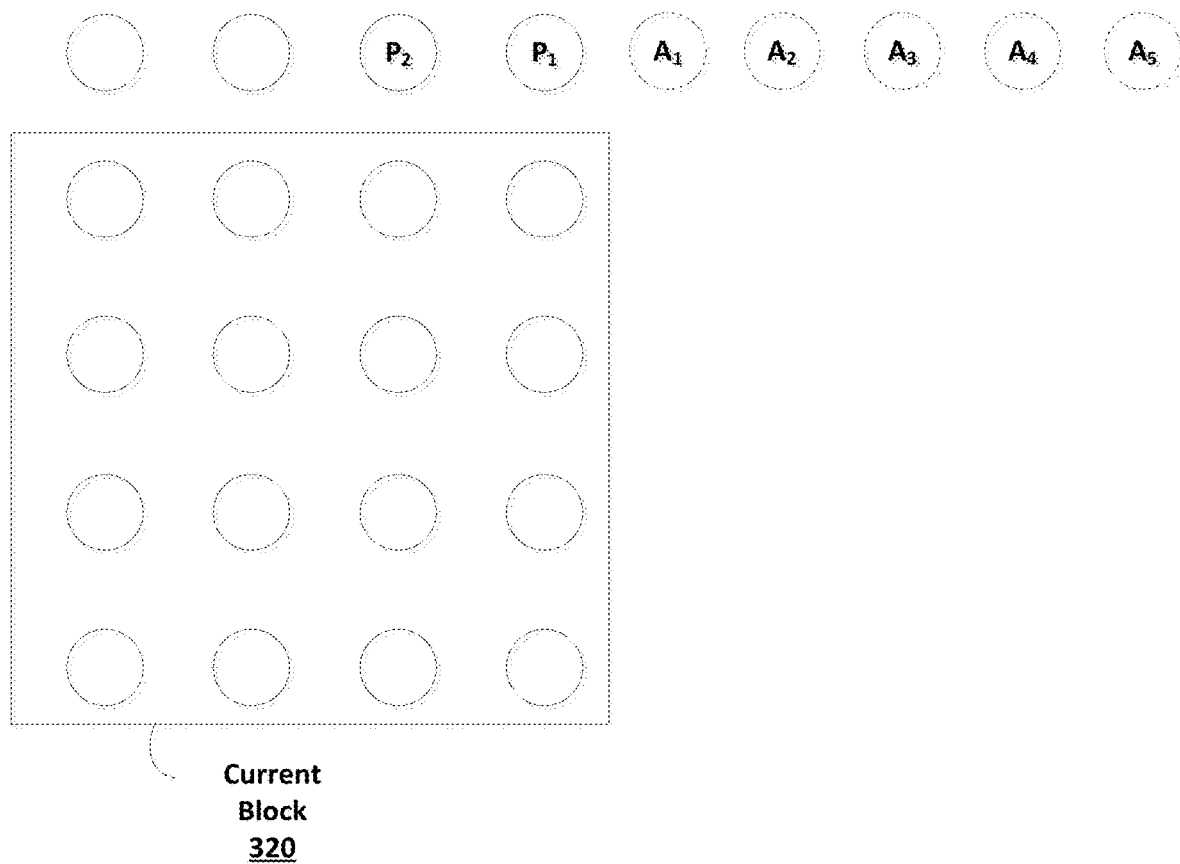
FIG. 13 shows an example of filtering padded unavailable neighboring pixels according to techniques of this disclosure.

FIG. 13 shows an example of filtering padded unavailable neighboring pixels to predicted current block 320. In one example:

Value($A_1$)'=(2×Value($A_1$)+Value($P_1$)+Value($A_2$))/4

Value($A_x$)'=(2×Value($A_x$)+Value($A_{x-1}$)+Value($A_{x+1}$))/4, if 1<x<N

Value($A_N$)'=(3×Value($A_N$)+Value($A_{N-1}$))/4

Value(X)' represents the value of pixel X after filtering. N represents the last padded unavailable neighboring pixel used for the intra-prediction process.

According to another technique of this disclosure, far neighboring pixels used to pad the unavailable neighboring pixels used for the intra-prediction process for the current block may be selected such that all the far neighboring pixels belong to one row (if the intra-prediction direction θ is between Vertical 0° and Vertical −45°), or one column (if the intra-prediction direction θ is between Horizontal 0° and Horizontal −45°). If one or more far neighboring pixels used to pad the unavailable neighboring pixels are unavailable themselves, they can be padded from the near available far neighboring pixel.

Figure 14:
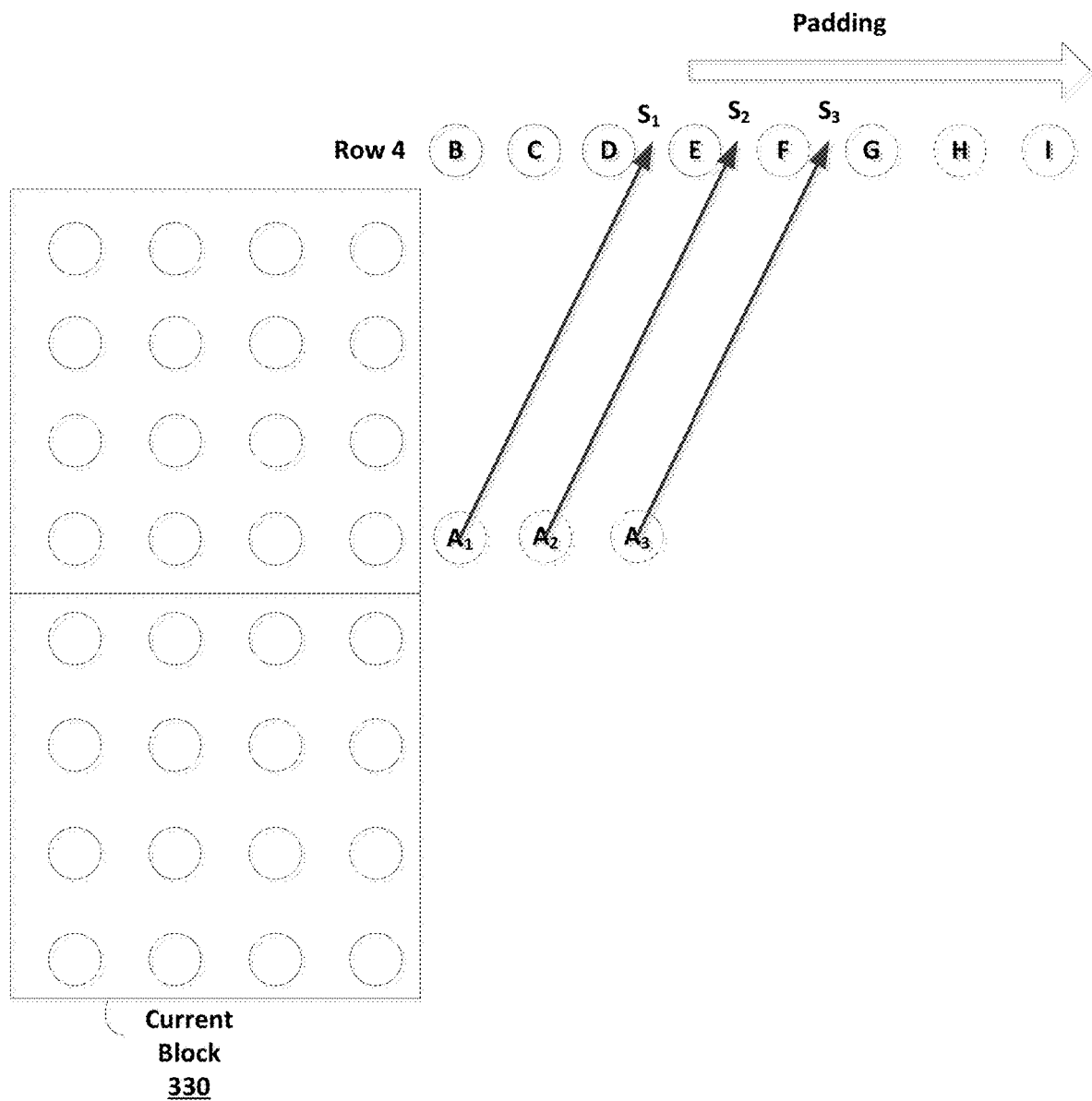
FIG. 14 shows an example of padding unavailable far neighboring pixels from available far neighboring pixels based on techniques of this disclosure.

FIG. 14 shows an example of padding unavailable far neighboring pixels from the available far neighboring pixels. $A_1$, $A_2$ and $A_3$ should be padded from the same row with far neighboring pixel B, C, D, . . . G, H, and I. If F, G, H and I are unavailable, they can be padded by the nearest available pixel in this row: E. Then they can be used to pad the unavailable neighboring pixels such as $A_2$ and $A_3$.

Figure 15:
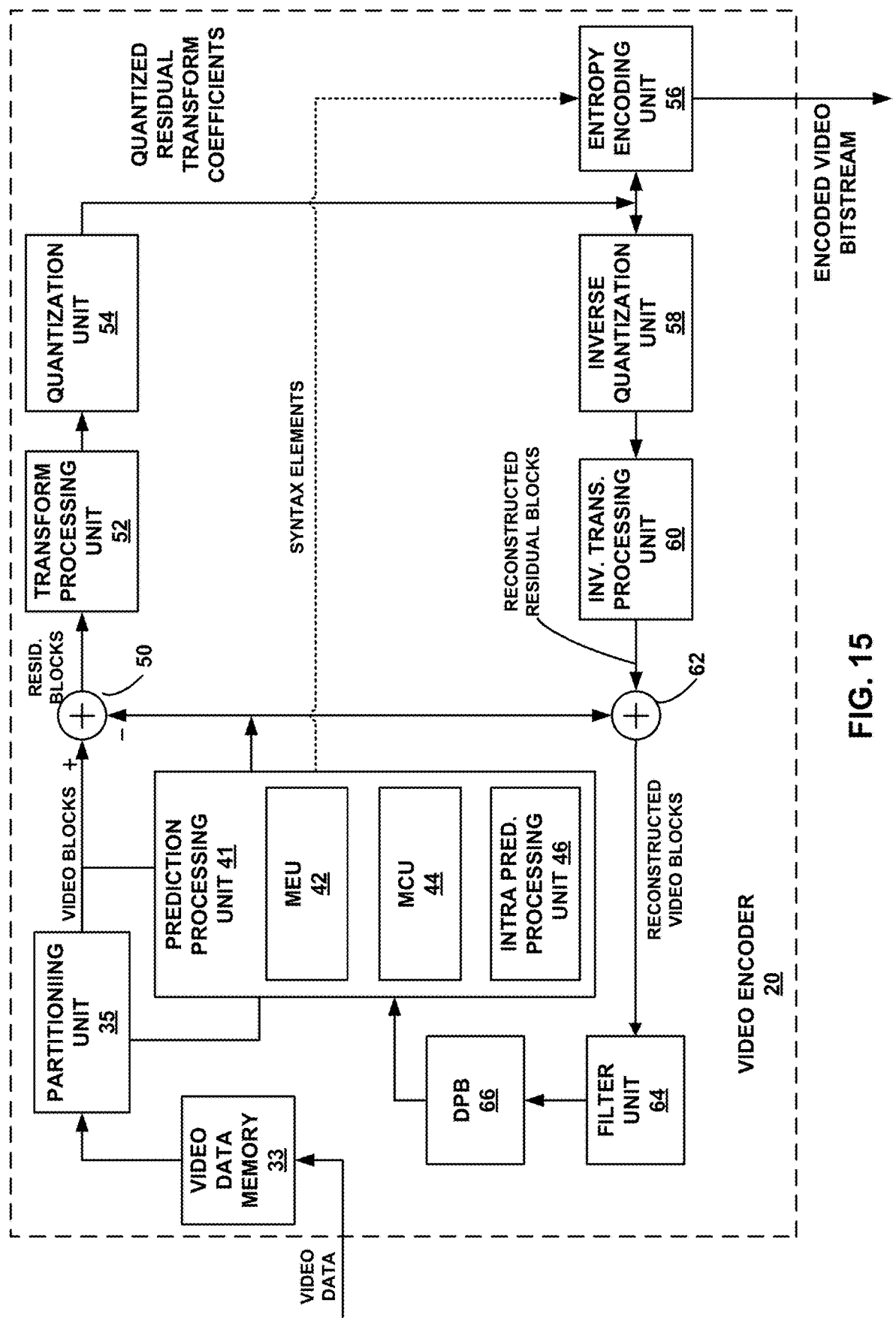
FIG. 15 is a block diagram illustrating an example video encoder that may implement the techniques described in this disclosure.

FIG. 15 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 15, video encoder 20 includes a video data memory 33, partitioning unit 35, prediction processing unit 41, summer 50, transform processing unit 52, quantization unit 54, entropy encoding unit 56. Prediction processing unit 41 includes motion estimation unit (MEU) 42, motion compensation unit (MCU) 44, and intra prediction processing unit 46. For video block reconstruction, video encoder 20 also includes inverse quantization unit 58, inverse transform processing unit 60, summer 62, filter unit 64, and decoded picture buffer (DPB) 66.

As shown in FIG. 15, video encoder 20 receives video data and stores the received video data in video data memory 33. Video data memory 33 may store video data to be encoded by the components of video encoder 20. The video data stored in video data memory 33 may be obtained, for example, from video source 18. DPB 66 may be a reference picture memory that stores reference video data for use in encoding video data by video encoder 20, e.g., in intra- or inter-coding modes. Video data memory 33 and DPB 66 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 33 and DPB 66 may be provided by the same memory device or separate memory devices. In various examples, video data memory 33 may be on-chip with other components of video encoder 20, or off-chip relative to those components.

Partitioning unit 35 retrieves the video data from video data memory 33 and partitions the video data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction processing unit 46 within prediction processing unit 41 may perform intra-predictive coding of the current video block relative to one or more neighboring blocks in the same frame or slice as the current block to be coded to provide spatial compression. According to various techniques described in this disclosure, intra prediction processing unit 46 may be configured to intra predict a block of video data using samples that are already reconstructed and not adjacent to the block of video data. Based on the one or more samples, intra prediction processing unit 46 may generate a predictive block for the block of video data.

Motion estimation unit 42 and motion compensation unit 44 within prediction processing unit 41 perform inter-predictive coding of the current video block relative to one or more predictive blocks in one or more reference pictures to provide temporal compression. Motion estimation unit 42 may be configured to determine the inter-prediction mode for a video slice according to a predetermined pattern for a video sequence. The predetermined pattern may designate video slices in the sequence as P slices or B slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in DPB 66. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in DPB 66. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

After prediction processing unit 41 generates the predictive block for the current video block, either via intra prediction or inter prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. In another example, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed block.

Filter unit 64 filters the reconstructed block (e.g. the output of summer 62) and stores the filtered reconstructed block in DPB 66 for uses as a reference block. The reference block may be used by motion estimation unit 42 and motion compensation unit 44 as a reference block to inter-predict a block in a subsequent video frame or picture. Filter unit 64 is intended to represent one or more of a deblocking filter, a sample adaptive offset filter, and adaptive loop filter, or other types of filters. A deblock filter may, for example, apply deblocking filtering to filter block boundaries to remove blockiness artifacts from reconstructed video. A sample adaptive offset filter may apply offsets to reconstructed pixel values in order to improve overall coding quality. Additional loop filters (in loop or post loop) may also be used.

Figure 16:
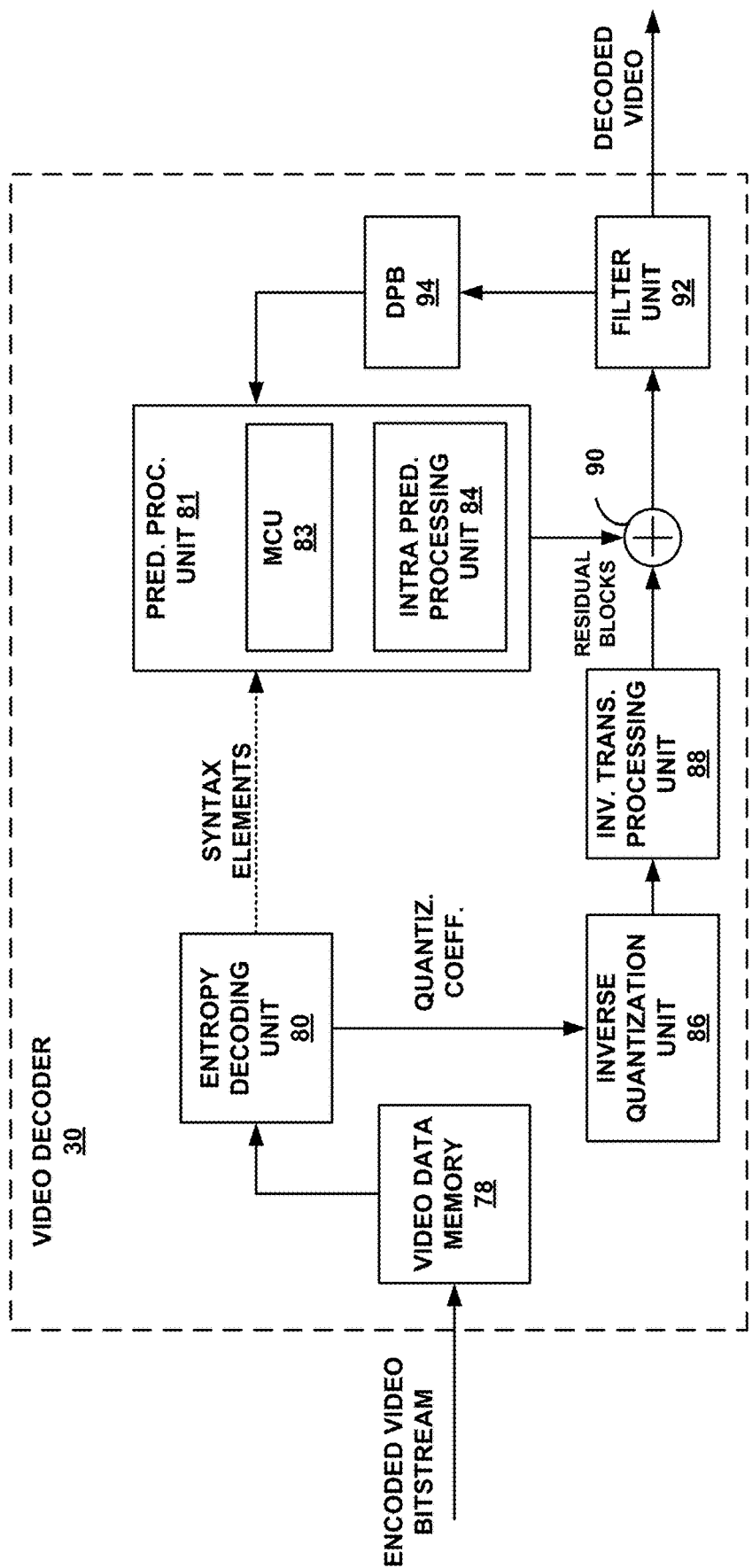
FIG. 16 is a block diagram illustrating an example video decoder that may implement the techniques described in this disclosure.

FIG. 16 is a block diagram illustrating an example video decoder 30 that may implement the techniques described in this disclosure. Video decoder 30 of FIG. 16 may, for example, be configured to receive the signaling described above with respect to video encoder 20 of FIG. 15. In the example of FIG. 16, video decoder 30 includes video data memory 78, entropy decoding unit 80, prediction processing unit 81, inverse quantization unit 86, inverse transform processing unit 88, summer 90, filter unit 92, and DPB 94. Prediction processing unit 81 includes motion compensation unit 82 and intra prediction unit 84. Video decoder 30 may, in some examples, perform a decoding pass generally reciprocal to the encoding pass described with respect to video encoder 20 from FIG. 15.

During the decoding process, video decoder 30 receives an encoded video bitstream that represents video blocks of an encoded video slice and associated syntax elements from video encoder 20. Video decoder 30 stores the received encoded video bitstream in video data memory 78. Video data memory 78 may store video data, such as an encoded video bitstream, to be decoded by the components of video decoder 30. The video data stored in video data memory 78 may be obtained, for example, via link 16, from storage device 26, or from a local video source, such as a camera, or by accessing physical data storage media. Video data memory 78 may form a coded picture buffer (CPB) that stores encoded video data from an encoded video bitstream. DPB 94 may be a reference picture memory that stores reference video data for use in decoding video data by video decoder 30, e.g., in intra- or inter-coding modes. Video data memory 78 and DPB 94 may be formed by any of a variety of memory devices, such as DRAM, SDRAM, MRAM, RRAM, or other types of memory devices. Video data memory 78 and DPB 94 may be provided by the same memory device or separate memory devices. In various examples, video data memory 78 may be on-chip with other components of video decoder 30, or off-chip relative to those components.

Entropy decoding unit 80 of video decoder 30 entropy decodes the video data stored in video data memory 78 to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction unit 84 of prediction processing unit 81 may generate prediction data for a video block of the current video slice based on a signaled intra prediction mode and data from previously decoded blocks of the current frame or picture. According to various techniques described in this disclosure, intra prediction processing unit 84 may be configured to intra predict a block of video data using samples that are already reconstructed and not adjacent to the block of video data. Based on the one or more samples, intra prediction processing unit 84 may generate a predictive block for the block of video data.

When the video frame is coded as an inter-coded slice (e.g., B slice or P slice), motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in DPB 94.

Motion compensation unit 82 determines prediction information for a video block of the current video slice by parsing the motion vectors and other syntax elements and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After prediction processing unit generates the predictive block for the current video block using, for example, intra or inter prediction, video decoder 30 forms a reconstructed video block by summing the residual blocks from inverse transform processing unit 88 with the corresponding predictive blocks generated by motion compensation unit 82. Summer 90 represents the component or components that perform this summation operation.

Filter unit 92 filters the reconstructed video block using, for example, one or more of deblock filtering, SAO filtering, adaptive loop filtering, or other types of filters. Other loop filters (either in the coding loop or after the coding loop) may also be used to smooth pixel transitions or otherwise improve the video quality. The decoded video blocks in a given frame or picture are then stored in DPB 94, which stores reference pictures used for subsequent motion compensation. DPB 94 may be part of or separate from additional memory that stores decoded video for later presentation on a display device, such as display device 32 of FIG. 1.

Figure 17:
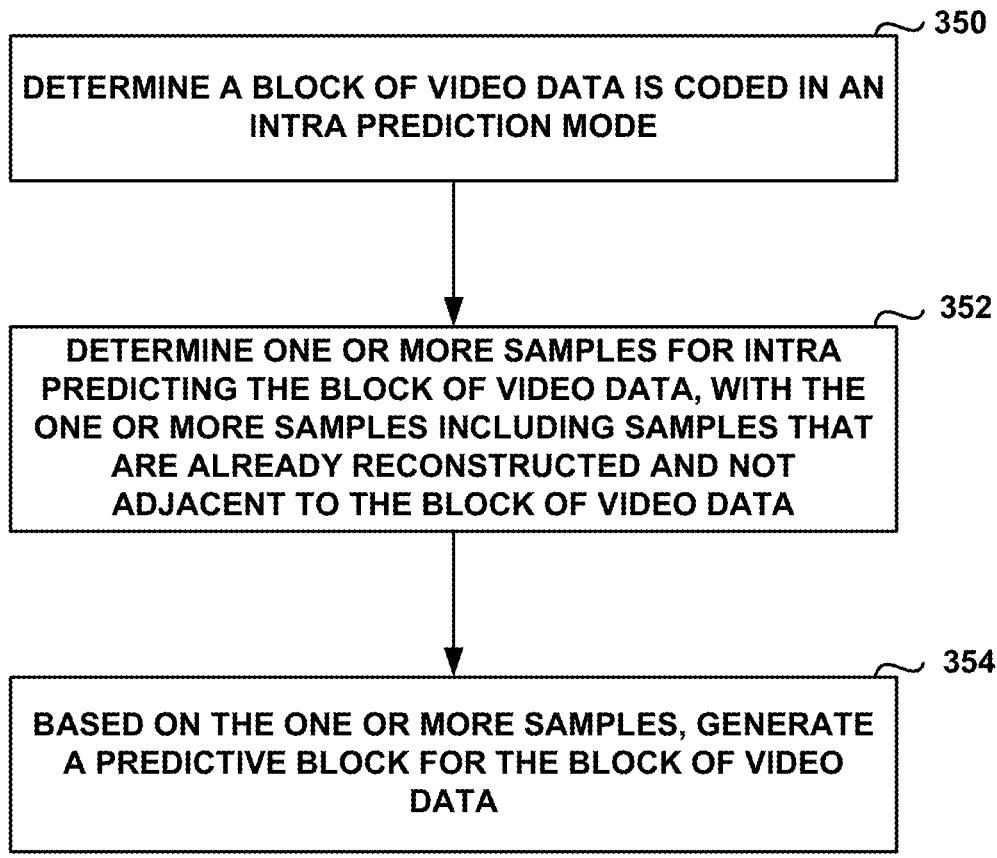
FIG. 17 is a flowchart illustrating an example operation of a video decoder for decoding video data in accordance with a technique of this disclosure.

FIG. 17 is a flowchart illustrating an example operation of a video decoder for decoding video data in accordance with a technique of this disclosure. The video decoder described with respect to FIG. 17 may, for example, be a video decoder, such as video decoder 30, for outputting displayable decoded video or may be a video decoder implemented in a video encoder, such as the decoding loop of video encoder 20, which includes prediction processing unit 41, inverse quantization unit 58, inverse transform processing unit 60, filter unit 64, and DPB 66.

The video decoder determines a block of video data is coded in an intra prediction mode (350). The video decoder determines one or more samples for intra predicting the block of video data, with the one or more samples including samples that are already reconstructed and not adjacent to the block of video data (352). The one or more samples for intra predicting the block of video data may further include one or more of samples that belong to neighboring blocks adjacent to the block of video data, samples that belong to far neighboring blocks not adjacent to the block of video data, or samples that belong to blocks in a reference frame identified by a motion vector.

Based on the one or more samples, the video decoder generates a predictive block for the block of video data (354). The video decoder may additionally add a block of residual sample values to the predictive block to generate a reconstructed block for the block of video data and perform one or more filtering operations on the reconstructed block. The video decoder may either or both of output a picture comprising the filtered reconstructed block for display and store a picture including the filtered reconstructed block in a decoded picture buffer.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for decoding video data, the method comprising:
   determining a current coding unit of the video data is coded in an intra prediction mode;
   determining samples for intra predicting the current coding unit, wherein the samples comprise a first set of samples that are already reconstructed and belong to a first coding unit that is adjacent to the current coding unit and a second set of samples that are already reconstructed and belong to a second coding unit that is not adjacent to the current coding unit, wherein determining the samples for intra predicting the current coding unit comprises locating, for a first sample to be predicted for the second set of samples, a first available sample on a line starting from the first sample along a direction defined by the intra-prediction mode of the current coding unit, wherein the first available sample does not border the current coding unit; and
   generating a predictive block for the current coding unit based on the samples in accordance with the intra prediction mode.

2. The method of claim 1, further comprising:
   adding a block of residual sample values to the predictive block to generate a reconstructed block for the current coding unit;
   performing one or more filtering operations on the reconstructed block; and
   outputting a picture comprising the filtered reconstructed block.

3. The method of claim 1, wherein determining the samples for intra predicting the current coding unit further comprises:
   for the first sample to be predicted for the second set of samples, locating a first available row or column of samples on the line starting from the first sample along the direction defined by the intra-prediction mode of the current coding unit, wherein the first available row or column of samples does not border the current coding unit.

4. The method of claim 1, wherein the method for decoding the current coding unit is performed as part of a process for encoding the current coding unit.

5. A device for decoding video data, the device comprising:
   a memory configured to store the video data; and
   one or more processors configured to:

determine a current coding unit of the video data is coded in an intra prediction mode;

determine samples for intra predicting the current coding unit, wherein the samples comprise a first set of samples that are already reconstructed and belong to a first coding unit that is adjacent to the current coding unit and a second set of samples that are already reconstructed and belong to a second coding unit that is not adjacent to the current coding unit, wherein to determine the samples for intra predicting the current coding unit, the one or more processors are further configured to locate, for a first sample to be predicted for the second set of samples, a first available sample on a line starting from the first sample along a direction defined by the intra-prediction mode of the current coding unit, wherein the first available sample does not border the current coding unit; and generate a predictive block for the current coding unit based on the samples in accordance with the intra prediction mode.

6. The device of claim 5, wherein the one or more processors are further configured to:

add a block of residual sample values to the predictive block to generate a reconstructed block for the current coding unit;

perform one or more filtering operations on the reconstructed block; and output a picture comprising the filtered reconstructed block.

7. The device of claim 5, wherein to determine the samples for intra predicting the current coding unit, the one or more processors are further configured to:

for the first sample to be predicted for the second set of samples, locate a first available row or column of samples on the line starting from the first sample along the direction defined by the intra-prediction mode of the current coding unit, wherein the first available row or column of samples does not border the current coding unit.

8. The device of claim 5, wherein the one or more processors are configured to generate the predictive block for the current coding unit as part of a process for encoding the current coding unit.

9. A non-transitory computer-readable storage medium storing instructions that when executed by one or more processors cause the one or more processors to:

determine a current coding unit of video data is coded in an intra prediction mode;

determine samples for intra predicting the current coding unit, wherein the samples comprise a first set of samples that are already reconstructed and belong to a first coding unit that is adjacent to the current coding unit and a second set of samples that are already reconstructed and belong to a second coding unit that is not adjacent to the current coding unit, wherein to determine the samples for intra predicting the current coding unit, the instructions are configured to cause the one or more processors are further configured to locate, for a first sample to be predicted for the second set of samples, a first available sample on a line starting from the first sample along a direction defined by the intra-prediction mode of the current coding unit, wherein the first available sample does not border the current coding unit; and generate a predictive block for the current coding unit based on the samples in accordance with the intra prediction mode.

10. The method of claim 1, wherein determining the second set of samples for intra predicting the current coding unit further comprises:

determining an availability of a third coding unit that is adjacent to the first coding unit;

determining that the second coding unit is available; and in response to the second coding unit being available and the third coding unit being unavailable, determining the samples for intra predicting the current coding unit from the second coding unit.

11. The method of claim 1, wherein determining the samples for intra predicting the current coding unit further comprises determining a set of padded values for unavailable neighboring samples based on the second set of samples.

12. The device of claim 5, wherein to determine the second set of samples for intra predicting the current coding unit, the one or more processors are further configured to:

determine an availability of a third coding unit that is adjacent to the first coding unit;

determine that the second coding unit is available; and in response to the second coding unit being available and the third coding unit being unavailable, determine the samples for intra predicting the current coding unit from the second coding unit.

13. The device of claim 5, wherein to determine the samples for intra predicting the current coding unit, the one or more processors are further configured to determine a set of padded values for unavailable neighboring samples based on the second set of samples.

14. A device for decoding video data, the device comprising:

a memory configured to store the video data; and one or more processors configured to:

determine a current coding unit of the video data is coded in an intra prediction mode;

determine samples for intra predicting the current coding unit, wherein the samples comprise a first set of samples that are already reconstructed and belong to a first coding unit that is adjacent to the current coding unit and a second set of samples that are already reconstructed and belong to a second coding unit that is not adjacent to the current coding unit, wherein to determine the second set of samples for intra predicting the current coding unit, the one or more processors are further configured to:

determine an availability of a third coding unit that is adjacent to the first coding unit;

determine that the second coding unit is available; and in response to the second coding unit being available and the third coding unit being unavailable, determine the samples for intra predicting the current coding unit from the second coding unit; and generate a predictive block for the current coding unit based on the samples in accordance with the intra prediction mode.

15. The device of claim 14, wherein the one or more processors are further configured to:

add a block of residual sample values to the predictive block to generate a reconstructed block for the current coding unit;

perform one or more filtering operations on the reconstructed block; and output a picture comprising the filtered reconstructed block.

\* \* \* \* \*